United States Patent
Anderson

(10) Patent No.: US 12,296,880 B2
(45) Date of Patent: May 13, 2025

(54) WATER HEATER HAND TRUCKS

(71) Applicant: Dale Lee Anderson, Fallbrook, CA (US)

(72) Inventor: Dale Lee Anderson, Fallbrook, CA (US)

( * ) Notice: Subject to any disclaimer, the term of this patent is extended or adjusted under 35 U.S.C. 154(b) by 0 days.

(21) Appl. No.: 18/440,776

(22) Filed: Feb. 13, 2024

(65) Prior Publication Data

US 2024/0262403 A1 Aug. 8, 2024

Related U.S. Application Data

(63) Continuation of application No. 17/494,757, filed on Oct. 5, 2021, now Pat. No. 11,897,528.

(Continued)

(51) Int. Cl.
*B62B 1/12* (2006.01)
*B62B 1/00* (2006.01)
(Continued)

(52) U.S. Cl.
CPC .............. *B62B 1/125* (2013.01); *B62B 1/008* (2013.01); *B62B 1/14* (2013.01); *B62B 1/264* (2013.01); *B62B 5/066* (2013.01)

(58) Field of Classification Search
CPC ........... B62B 1/125; B62B 1/008; B62B 1/14; B62B 1/264; B62B 5/066; B62B 1/12;
(Continued)

(56) References Cited

U.S. PATENT DOCUMENTS 3,804,432 A * 4/1974 Lehrman .................. B62B 1/12
280/654
4,728,245 A * 3/1988 Shelton ................ B62B 3/0618
414/490

(Continued)

FOREIGN PATENT DOCUMENTS

DE 20011002 U1 * 11/2000 ............. B62B 1/125
DE 102018005082 A1 * 1/2020
(Continued)

OTHER PUBLICATIONS

Translated copy of DE-102018005082-A1 (Year: 2024).*
Translated copy of GB-2354204-A (Year: 2024).*

*Primary Examiner* — James A Shriver, II
*Assistant Examiner* — Ian Bryce Shelton
(74) *Attorney, Agent, or Firm* — Chang & Hale LLP

(57) ABSTRACT

Disclosed herein are hand trucks for installing and removing water heaters. The disclosed water heater hand trucks enable a single person to lift the water heater onto a platform and to keep the water heater above the water heater pan during installation and removal. The disclosed hand trucks generally include a main platform and a wheel frame. A water heater is strapped to the main platform which has curved legs at the bottom with rubber landing feet. This design is used to keep the water heater above a water heater pan while lifting the water heater into position. This avoids crushing the pan with the water heater. The handles at the upper section of the main platform have adjustable positions. These handles can be opened up to an outward position to provide leverage, which can be advantageous when access to the platform is limited from a frontal approach.

13 Claims, 23 Drawing Sheets

Related U.S. Application Data

(60) Provisional application No. 63/087,347, filed on Oct. 5, 2020.

(51) Int. Cl.
  *B62B 1/14* (2006.01)
  *B62B 1/26* (2006.01)
  *B62B 5/06* (2006.01)

(58) Field of Classification Search
  CPC ... B62B 2202/80; B62B 1/16; B62B 2202/02; B62B 2203/02; B62B 2203/44; B62B 3/0606; B62B 3/104; B62B 2203/10
  See application file for complete search history.

(56) References Cited

U.S. PATENT DOCUMENTS

| | | | | |
|---|---|---|---|---|
| 4,865,339 | A * | 9/1989 | Rundborg | B62D 5/0487 414/346 |
| 6,799,769 | B2 * | 10/2004 | Ziolkowski | B62B 1/264 414/490 |
| 6,929,443 | B1 * | 8/2005 | Nellis | B62B 3/04 414/490 |
| 9,050,990 | B1 * | 6/2015 | Zalewski | B62B 1/10 |
| 9,321,471 | B1 * | 4/2016 | Gedeon-Janvier | B62B 3/02 |
| 10,173,704 | B2 * | 1/2019 | Jones | B62B 1/14 |
| 2001/0007387 | A1 * | 7/2001 | Gomez | B62B 5/06 280/47.17 |
| 2004/0256818 | A1 * | 12/2004 | Amsili | B62B 1/125 280/47.29 |
| 2005/0073118 | A1 * | 4/2005 | Sharp | B62B 1/12 280/47.24 |
| 2006/0082086 | A1 * | 4/2006 | Donaldson | B60B 29/002 280/47.27 |
| 2007/0114739 | A1 * | 5/2007 | Simmons | B62B 1/264 280/47.27 |
| 2008/0296866 | A1 * | 12/2008 | Martin | B62B 5/06 280/304.5 |
| 2009/0250889 | A1 * | 10/2009 | Palmore | B62B 5/06 280/47.21 |
| 2010/0021275 | A1 * | 1/2010 | Ratermann | B62B 1/14 414/454 |
| 2012/0153585 | A1 * | 6/2012 | Ryan | B62B 5/067 280/47.18 |
| 2012/0242063 | A1 * | 9/2012 | Bruckner | B62B 3/04 280/651 |
| 2013/0094928 | A1 * | 4/2013 | McFarland | B62B 1/12 414/457 |
| 2014/0145407 | A1 * | 5/2014 | Chen | B62B 1/22 280/47.12 |
| 2014/0145408 | A1 * | 5/2014 | Midas | B62B 3/104 280/47.131 |
| 2014/0319438 | A1 * | 10/2014 | Carlson | B62B 1/12 254/2 R |
| 2016/0368515 | A1 * | 12/2016 | Belotti | B62B 1/002 |
| 2018/0251143 | A1 * | 9/2018 | Benton | B62B 1/14 |
| 2018/0257687 | A1 * | 9/2018 | Birsen | F17C 13/084 |
| 2019/0039635 | A1 * | 2/2019 | Khubani | B62B 1/008 |
| 2019/0047601 | A1 * | 2/2019 | Murphy | B62B 1/18 |
| 2020/0239055 | A1 * | 7/2020 | Carlson | B62B 5/061 |
| 2020/0290662 | A1 * | 9/2020 | Hill | B62B 3/04 |
| 2020/0369306 | A1 * | 11/2020 | West, Jr. | B62B 1/002 |

FOREIGN PATENT DOCUMENTS

| | | | | |
|---|---|---|---|---|
| GB | 2351475 A | * | 1/2001 | B62B 1/14 |
| GB | 2354204 A | * | 3/2001 | A63B 55/60 |
| WO | WO-2017111754 A1 | * | 6/2017 | B62B 1/002 |

* cited by examiner

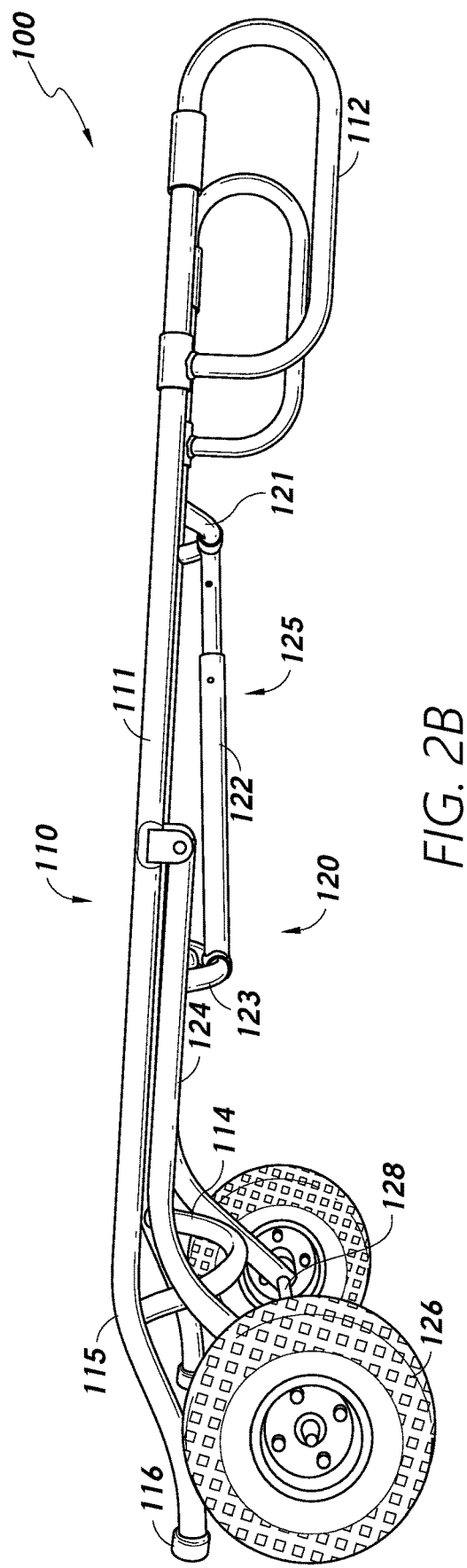
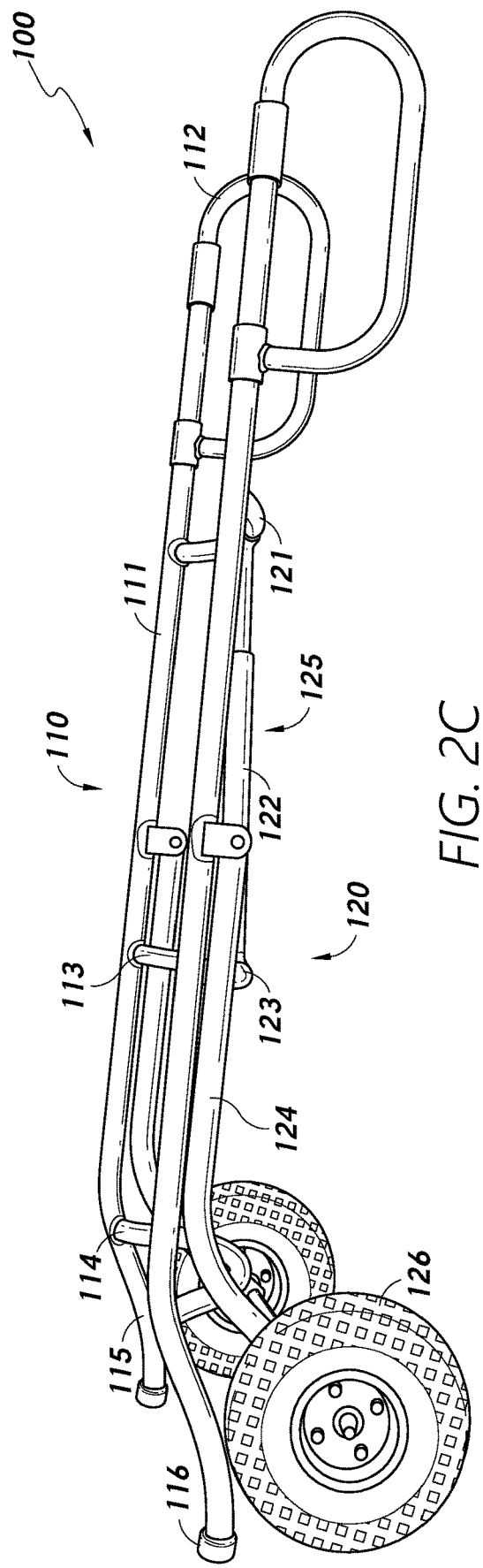
FIG. 2B
FIG. 2C

WATER HEATER HAND TRUCKS

CROSS-REFERENCE TO RELATED APPLICATION

This application is a continuation of U.S. application Ser. No. 17/494,757 filed Oct. 5, 2021 and entitled "WATER HEATER HAND TRUCKS," which claims priority to U.S. Prov. App. No. 63/087,347 filed Oct. 5, 2020 and entitled "WATER HEATER HAND TRUCKS," which is incorporated by reference herein in its entirety for all purposes.

BACKGROUND

Field

The present disclosure generally relates to hand trucks for water heaters.

Description of Related Art

Hand trucks are generally designed to help move heavy items from one place to another. A typical hand truck includes a platform, handles, and wheels. These general-purpose hand trucks can greatly facilitate moving heavy items but may lack utility for specific tasks. For example, water heaters are heavy items that can be moved using a hand truck. However, installing and replacing a water typically requires a plumber or other person to use a bear hug method to lift the water heater into and out of its installation location. This risks possible injury, damage to the water heater, and/or damage to the installation site.

SUMMARY

According to a number of implementations, the present disclosure relates to a hand truck for installing and removing water heaters. The hand truck includes a main platform that includes curved legs at a bottom portion of the main platform and handles at a top portion of the main platform, the handles being rotatable from a backwards-facing orientation to an outward-facing orientation. The hand truck also includes a wheel frame that includes a telescopic ram stop configured to guide the wheel frame from a closed position to an open position.

In some embodiments, the curved legs include rubber landing feet.

In some embodiments, the main platform is configured to lift a water heater onto a platform that is at least 18 inches high by a single person. In some embodiments, the curved legs of the main platform are configured to keep a water heater above a lip of a water heater pan while installing the water heater in the water heater pan. In some embodiments, the hand truck further includes a pin used to lock the wheel frame in place in the open position. In some embodiments, the main platform does not include a bottom ledge.

In some embodiments, the wheel frame includes a pair of wheels coupled to the wheel frame. In further embodiments, the wheel frame includes a pair of wheel support bars to rotatably couple the pair of wheels to the main platform. In further embodiments, the wheel support bars are coupled to vertical support bars of the main platform with hinged connectors.

In some embodiments, the main platform includes a pair of vertical support bars. In further embodiments, the main platform further includes a pair of curved cross bars extending between the pair of vertical support bars. In further embodiments, the wheel frame includes a curved main support bar that couples the telescoping ram stop to the vertical support bars of the main platform.

In some embodiments, the curved legs curve backwards toward the wheel platform. In some embodiments, in the closed position, the wheel frame is adjacent to the main platform. In some embodiments, in the closed position, a pair of wheels of the wheel frame are near the curved legs of the main platform. In some embodiments, in the open position, the wheel frame forms an angle of 90 degrees or less with the main platform. In some embodiments, in the open position, the wheel frame is approximately perpendicular to the main platform.

In some embodiments, the handles rotatably couple to vertical support bars of the main platform and are configured to be locked in the backwards-facing orientation and in the outward-facing orientation. In further embodiments, a pin is used to lock the handles in the backwards-facing orientation and in the outward-facing orientation.

In some embodiments, the telescoping ram stop includes telescoping cylinders that are in a shortened configuration in the open position and in a lengthened configuration in the closed position.

For purposes of summarizing the disclosure, certain aspects, advantages and novel features have been described herein. It is to be understood that not necessarily all such advantages may be achieved in accordance with any particular embodiment. Thus, the disclosed embodiments may be carried out in a manner that achieves or optimizes one advantage or group of advantages as taught herein without necessarily achieving other advantages as may be taught or suggested herein.

BRIEF DESCRIPTION OF THE DRAWINGS

FIGS. 2A, 2B, and 2C illustrate the water heater hand truck in the closed position, where the wheel frame is adjacent to the main platform.

DETAILED DESCRIPTION OF SOME EMBODIMENTS

Figure 1A:
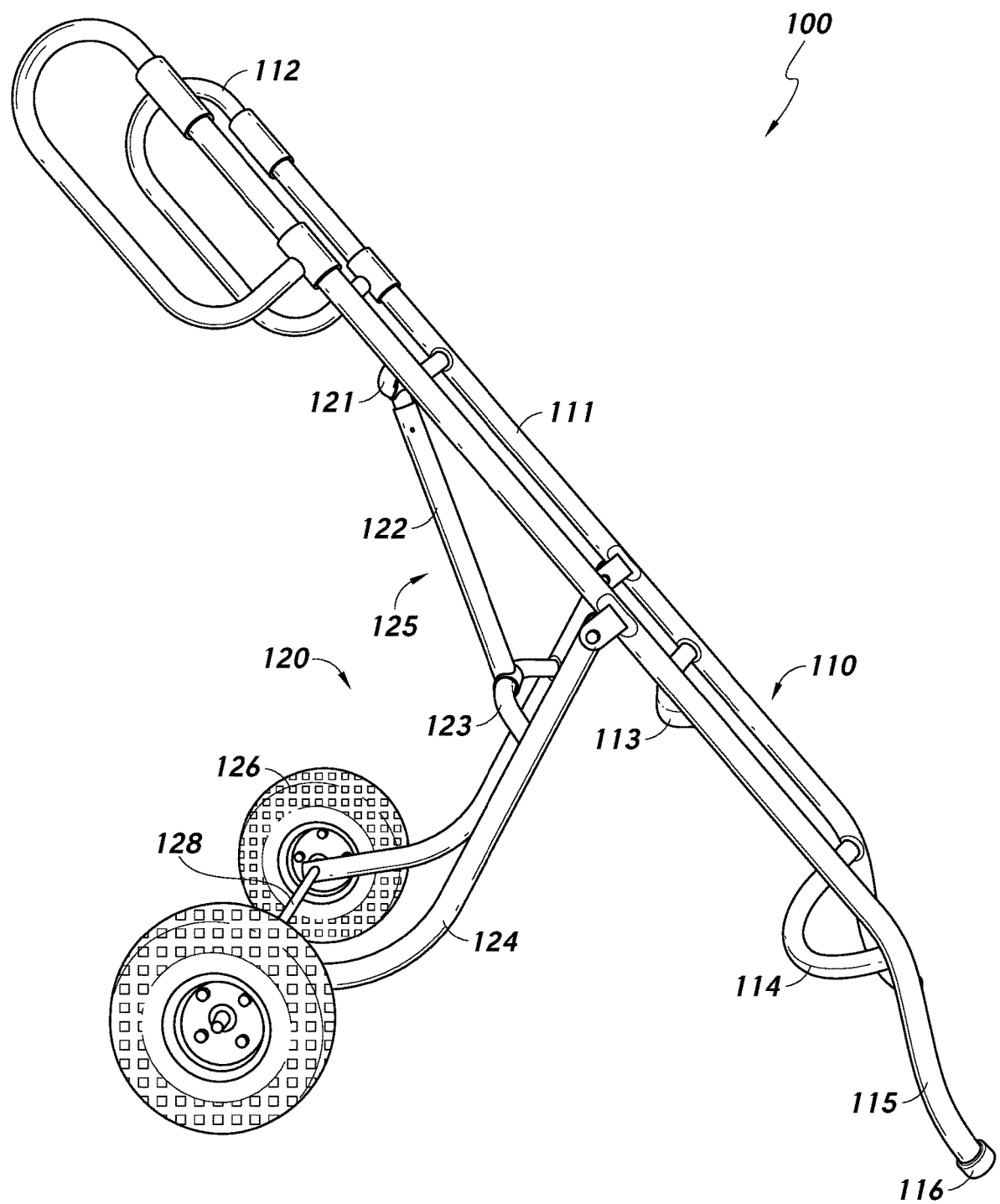
FIGS. 1A, 1B, 1C, and 1D illustrate an example water heater hand truck with a main platform and a wheel frame in an open position.
Figure 1B:
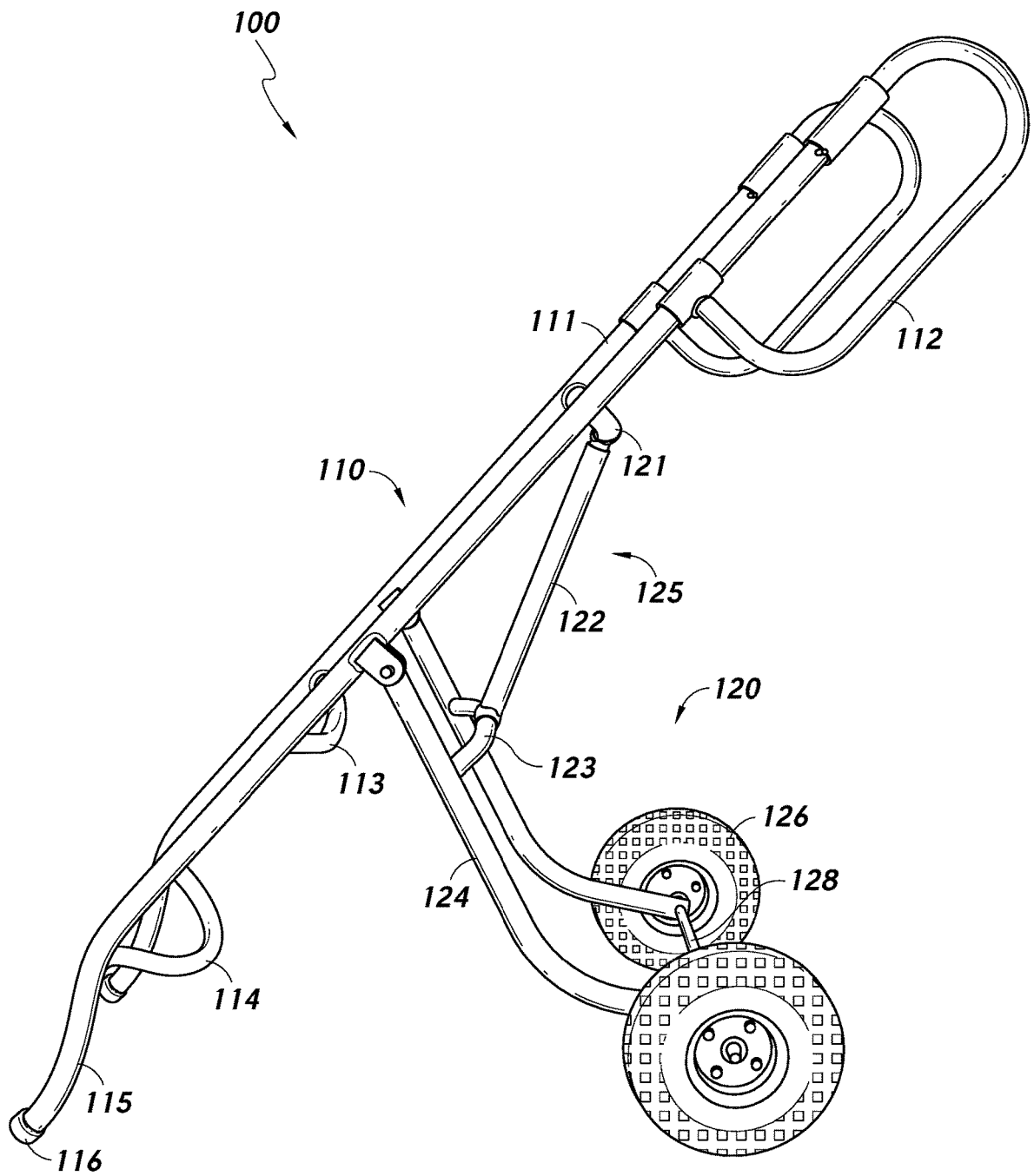
Figure 1C:
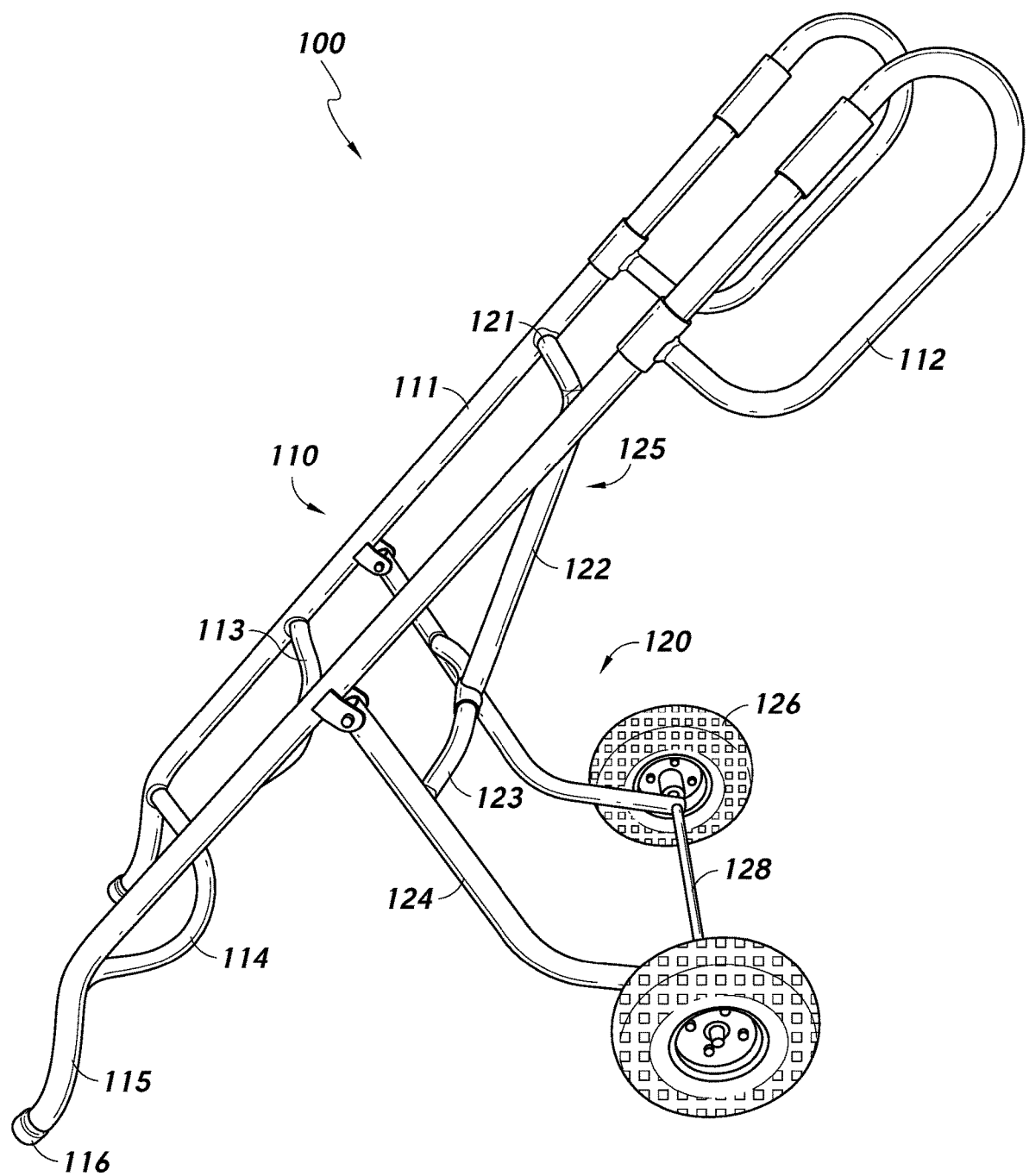
Figure 1D:
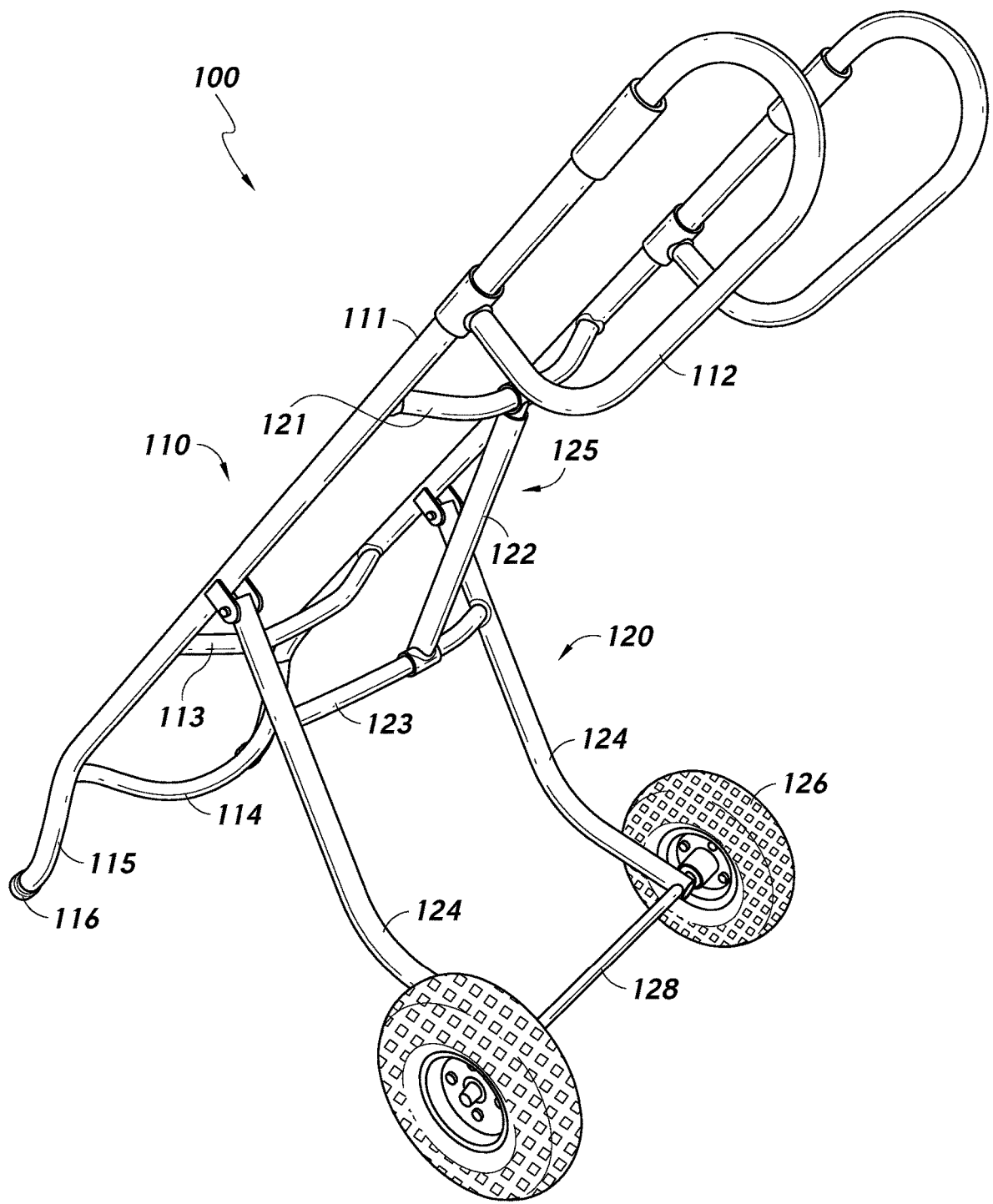

The headings provided herein, if any, are for convenience only and do not necessarily affect the scope or meaning of the claimed subject matter.

Overview

Disclosed herein are hand trucks for installing and removing water heaters. A typical hand truck is not suitable for installing and removing water heaters for a number of reasons. First, it may be difficult to lift a water heater onto a platform (e.g., an 18-inch platform) without the help of a second person. Typically, a plumber uses a bear hug method to remove and replace a water heater which puts stress on the body and risks possible injury on the installers back. Second, a typical hand truck cannot keep a water heater above a water heater pan during installation or removal. Accordingly, disclosed herein are hand trucks for water heaters that enable a single person to lift the water heater onto a platform and to keep the water heater above the water heater pan during installation and removal.

The disclosed hand trucks are simple in design and do not include cranks or pulleys. The disclosed hand trucks are designed to be operated by a single person. This advantageously reduces labor costs associated with installation and removal of water heaters. The disclosed hand trucks include a design tailored to the installation and removal of water heaters, with tailored features that facilitate such procedures relative to generic hand trucks.

The disclosed hand trucks generally include a main platform and a wheel frame. A water heater is strapped to the main platform which has curved legs at the bottom with rubber landing feet. This design with the curved legs is used to keep the water heater above a water heater pan while lifting the water heater into position. This avoids crushing the pan with the water heater. The handles at the upper section of the main platform have adjustable positions. These handles can be opened up (e.g., rotated) to an outward position to provide leverage, which can be advantageous when access to the platform is limited from a frontal approach. For example, when only one leg can make contact with the platform, the water heater can still be easily lifted and installed.

The wheel frame includes a curved foot to increase or maximize the leverage and to increase or maximize the height a person is able to lift a water heater. This is advantageous where platforms may be unusually high, such as exceeding 18 inches. The wheel frame also includes a telescopic ram stop that has been designed to guide the wheel frame from a typical hand truck position to an open position. A pin is installed in the open position to secure the wheel frame in place. In the open position, the hand truck is ready to be pulled back and used to wheel the water heater into position in preparation for installation.

The disclosed hand trucks provide a number of benefits. For example, the hand trucks facilitate lifting a water heater into position to a degree that is unexpected. The disclosed hand trucks can also be used to remove a water heater from a platform when the water heater is still full of water. The disclosed hand trucks can fold up like a ladder and can be stored easily in a service van or truck.

Example Water Heater Hand Trucks

Figure 2A:
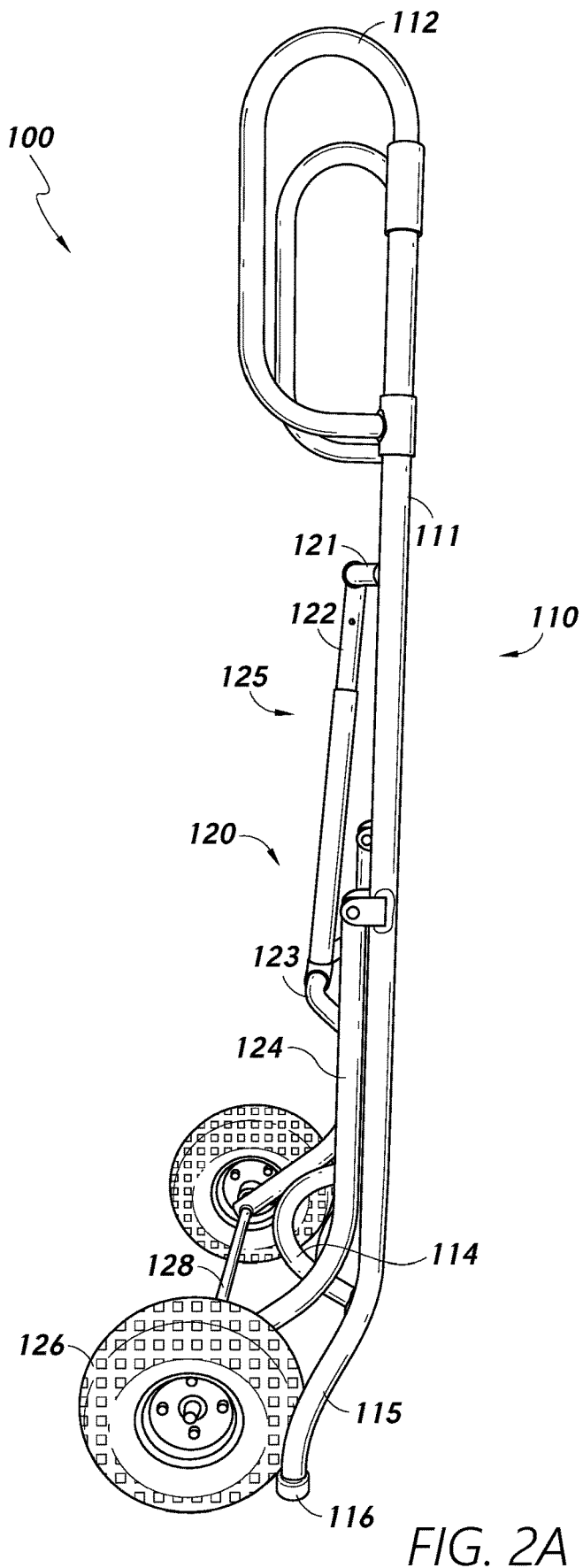

FIGS. 1A, 1B, 1C, and 1D illustrate an example water heater hand truck 100 with a main platform 110 and a wheel frame 120 in an open position. By open position, it is meant that the wheel frame 120 is extended away from the main platform 110. In contrast, FIGS. 2A, 2B, and 2C illustrate the water heater hand truck 100 in the closed position, where the wheel frame 120 is adjacent to the main platform 110. The hand truck 100 includes a telescoping ram stop 125 that facilitates the transition of the hand truck 100 from the open position (FIGS. 1A-1D) to the closed position (FIGS. 2A-2C).

The main platform 110 of the hand truck 100 includes a pair of vertical support bars 111, a pair of rotating handles 112 coupled to the vertical support bars 111, an upper cross bar 113 extending between the vertical support bars 111, a lower cross bar 114 extending between the vertical support bars 111, and curved legs 115 with rubber stoppers 116 or rubber landing feet, the curved legs 115 being a lower extremity of the vertical support bars 111. It is to be understood that the word vertical as it is used with respect to the vertical support bars 111 means a direction that runs lengthwise along the main platform 110. Consequently, the vertical support bars 111 may only be truly vertical when the hand truck 100 is in the closed position and balanced upright (e.g., as illustrated in FIGS. 2A-2C) and not laying down or angled in the open position (e.g., as illustrated in FIGS. 1A-1D).

The wheel frame 120 of the hand truck 100 includes the telescoping ram stop 125, a pair of wheel support bars 124 rotatably coupled to the vertical support bars 111, wheels 126 at distal ends of the wheel support bars 124, and axle 128 extending between the wheels 126. In some embodiments, the hand truck 100 includes a single pair of wheels. In certain embodiments, the hand truck 100 does not include wheels at distal ends of the vertical support bars 111.

Each wheel support bar 124 is rotatably coupled to a corresponding vertical support bar 111 at a hinge 117 such that, when transitioning the hand truck 100 from a closed position to an open position, the wheel support bars 124 rotate away from the vertical support bars 111. The wheel support bars 124 can be configured to be approximately parallel to the vertical support bars 111 in the closed position and approximately, but not necessarily, perpendicular to the vertical support bars 111 in the open position. In some embodiments, the angle formed by the vertical support bars 111 and the wheel support bars 124 is less than 90 degrees in the open position and greater than 0 degrees in the closed position. Thus, the hinges 117 enable rotation while the telescoping ram stop 125 limits the range of rotation of the wheel support bars 124 relative to the vertical support bars. The combination of these elements enables and limits rotation of the wheel support bars between about 0 degrees (e.g., parallel) and about 90 degrees (e.g., perpendicular).

The telescoping ram stop 125 is made of telescoping rods 122 (e.g., nested cylinders) that enable extension of the ram stop 125 between a shortened configuration (e.g., in the open position of the hand truck 100) and a lengthened configuration (e.g., in the closed position of the hand truck 100). The telescoping ram stop 125 includes a main bar support 121 that connects to and extends between the vertical support bars 111. The telescoping ram stop 125 also includes a wheel bar support 123 that connects to and extends between the wheel support bars 124. A pin can be used to secure the telescoping rods 122 in the open position and the closed position. In the open position (FIGS. 1A-1D), the telescoping rods 122 are in a shortened position (e.g., the telescoping rods almost completely overlap one another) and, in the closed position (FIGS. 2A-2C), the telescoping rods 122 are in an extended position (e.g., the telescoping rods overlap near the ends of each telescoping rod). In some embodiments, the telescoping rods 122 are configured to rotate on the wheel support bar 123 and the main bar support 121. Another example of telescoping rods is described in further detail herein with reference to FIG. 8.

Figure 3:
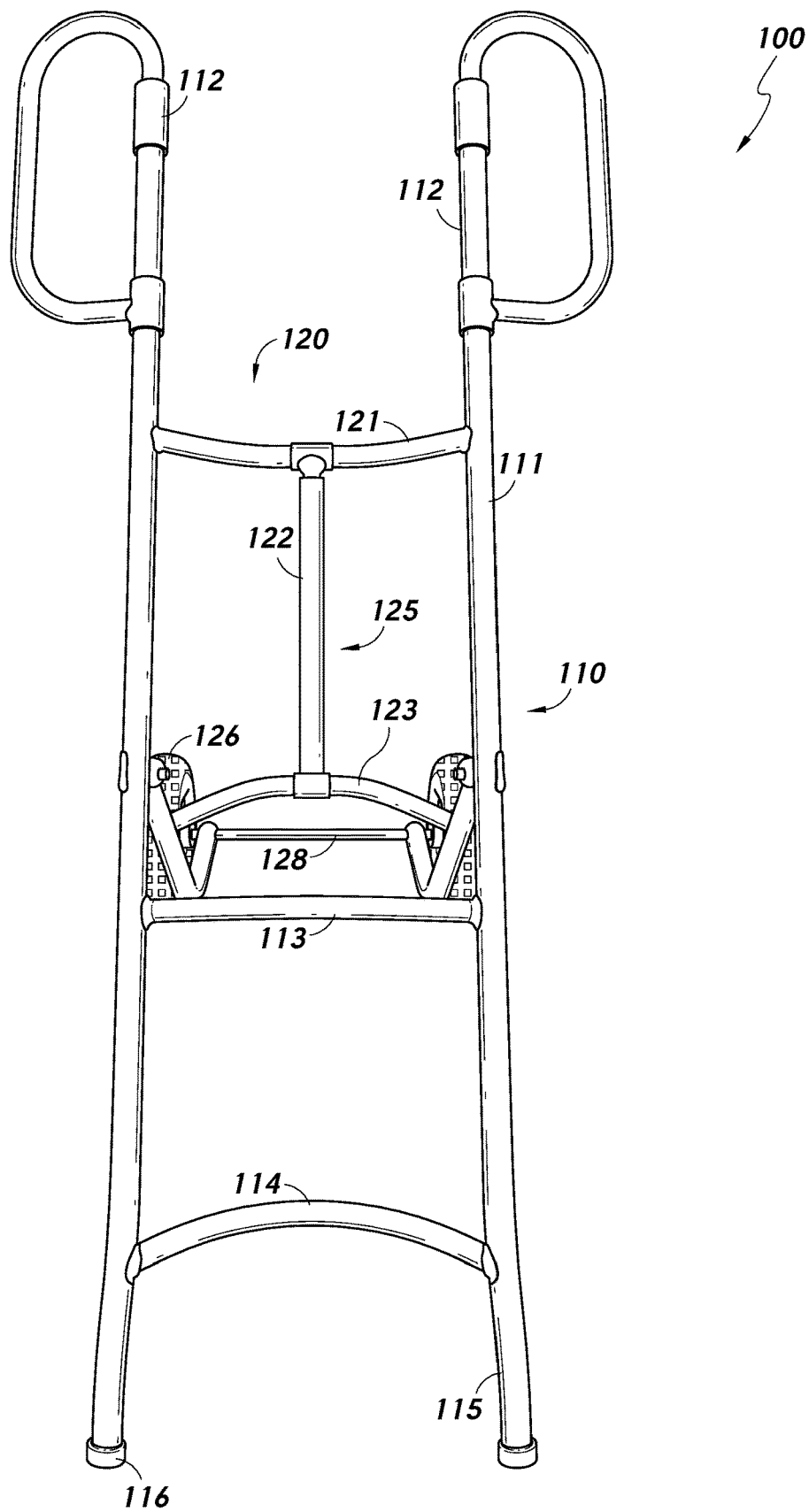
FIG. 3 illustrates that the handles can be rotated to provide improved leverage when installing a water heater.
Figure 7:
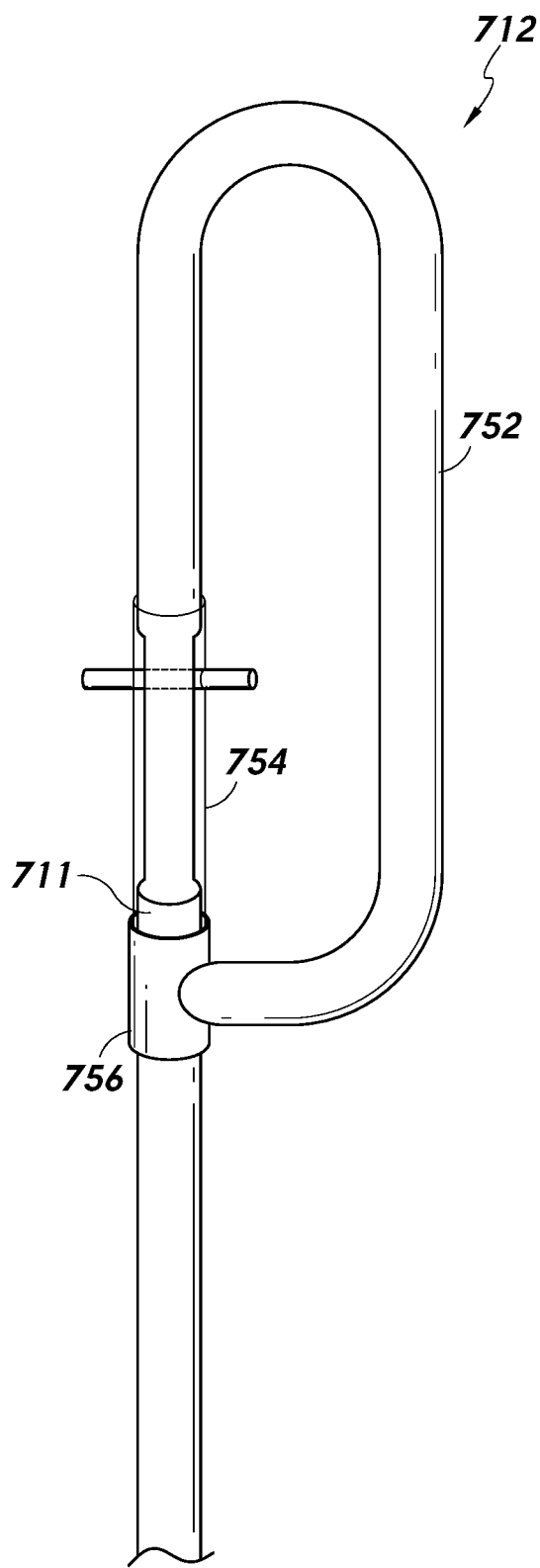
FIG. 7 illustrates an example handle of a water heater hand truck.

FIG. 3 illustrates that the handles 112 can be rotated outward to provide improved leverage when installing a water heater. FIGS. 1A-1D illustrate the handles 112 in a backward-facing orientation whereas FIG. 3 illustrates the handles 112 in an outward-facing orientation. A pin-locking system can be used to lock the handles in the backward-facing orientation and in the outward-facing orientation, an example of which is illustrated in FIG. 7. Other systems can be used as well to enable rotation of the handles 112 relative to the vertical support bars 111.

Figure 4A:
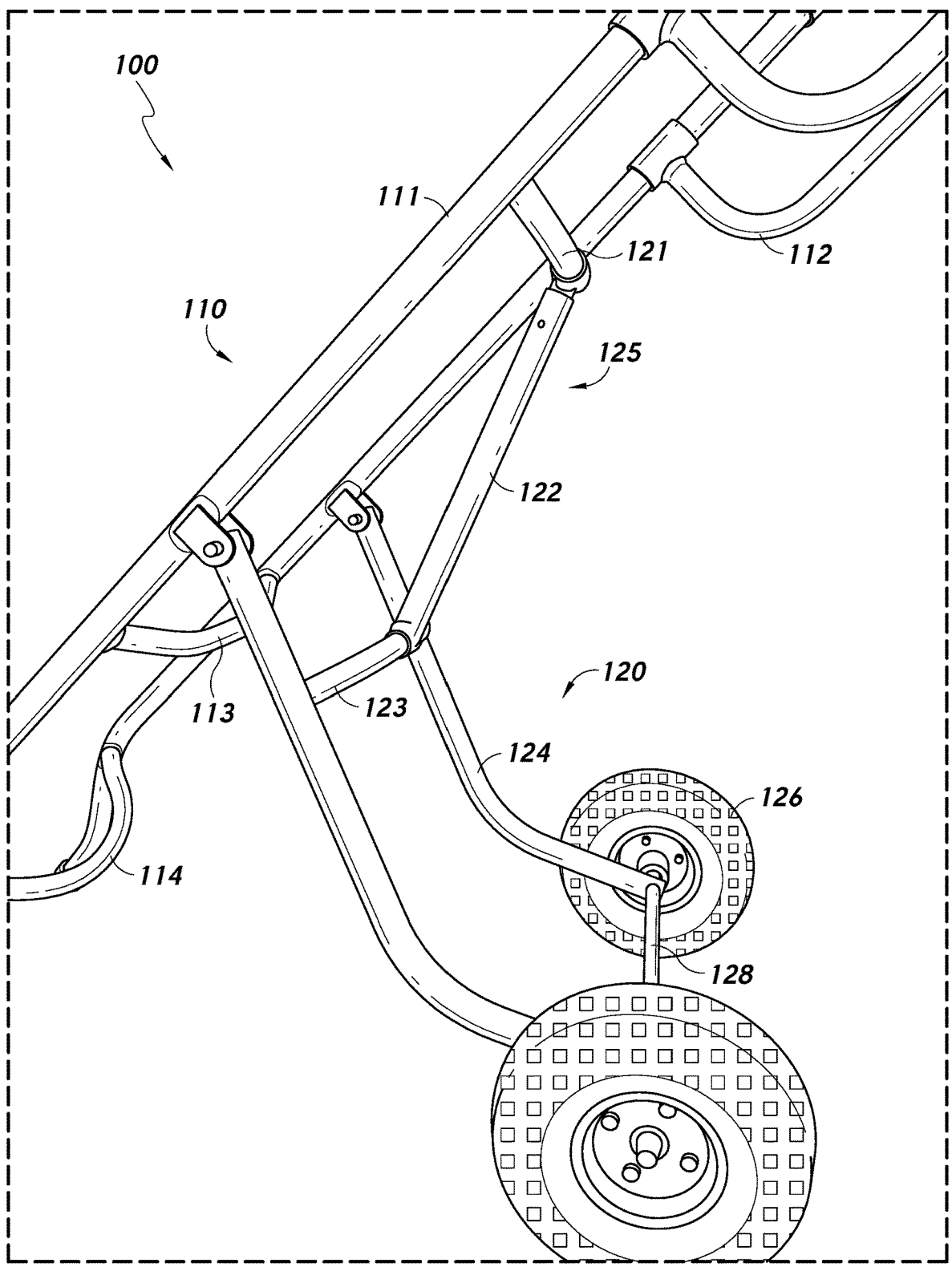
FIGS. 4A, 4B, and 4C illustrate various views of the hand truck to better illustrate the telescoping ram stop in relation to the main platform and the wheel frame.
Figure 4B:
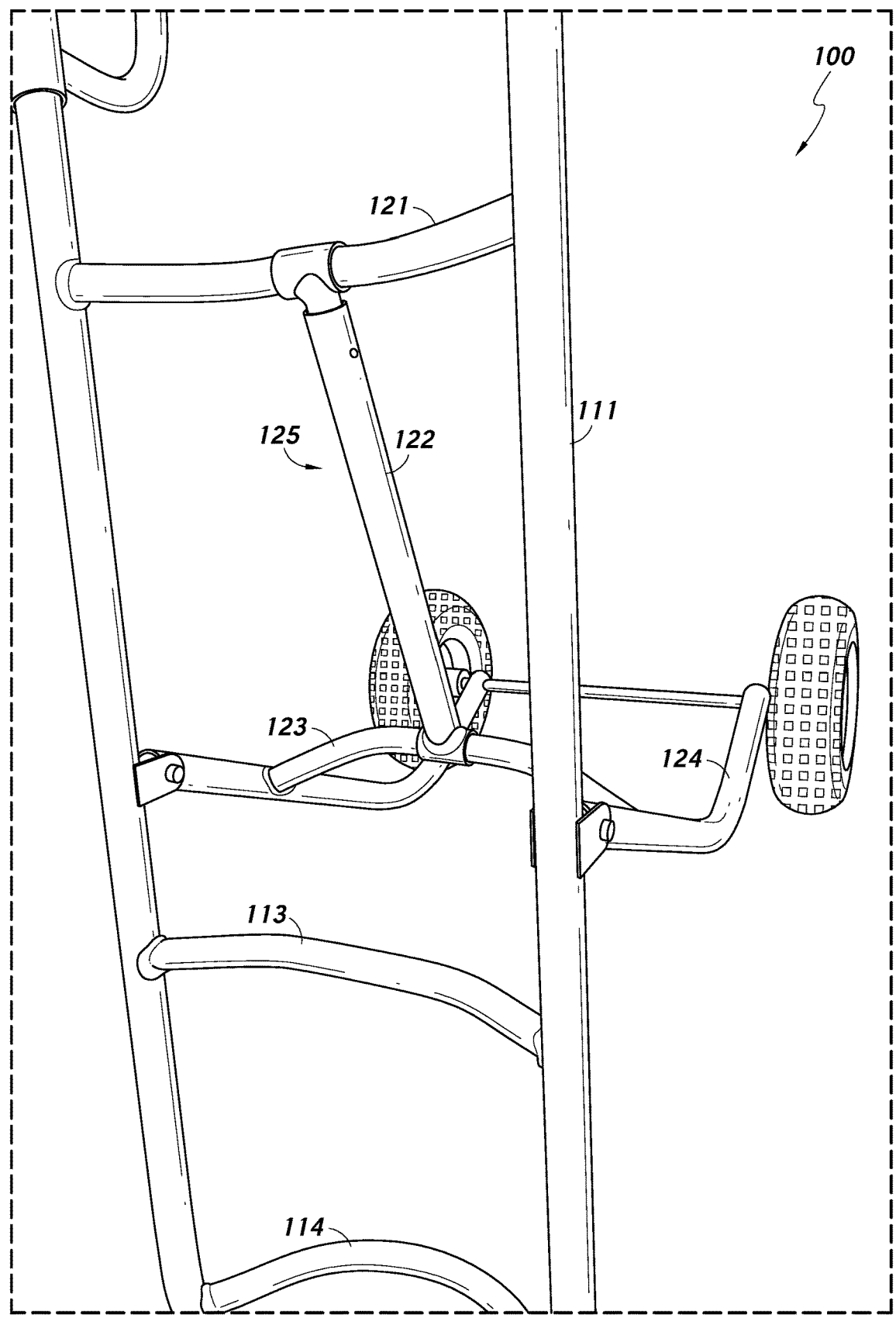
Figure 4C:
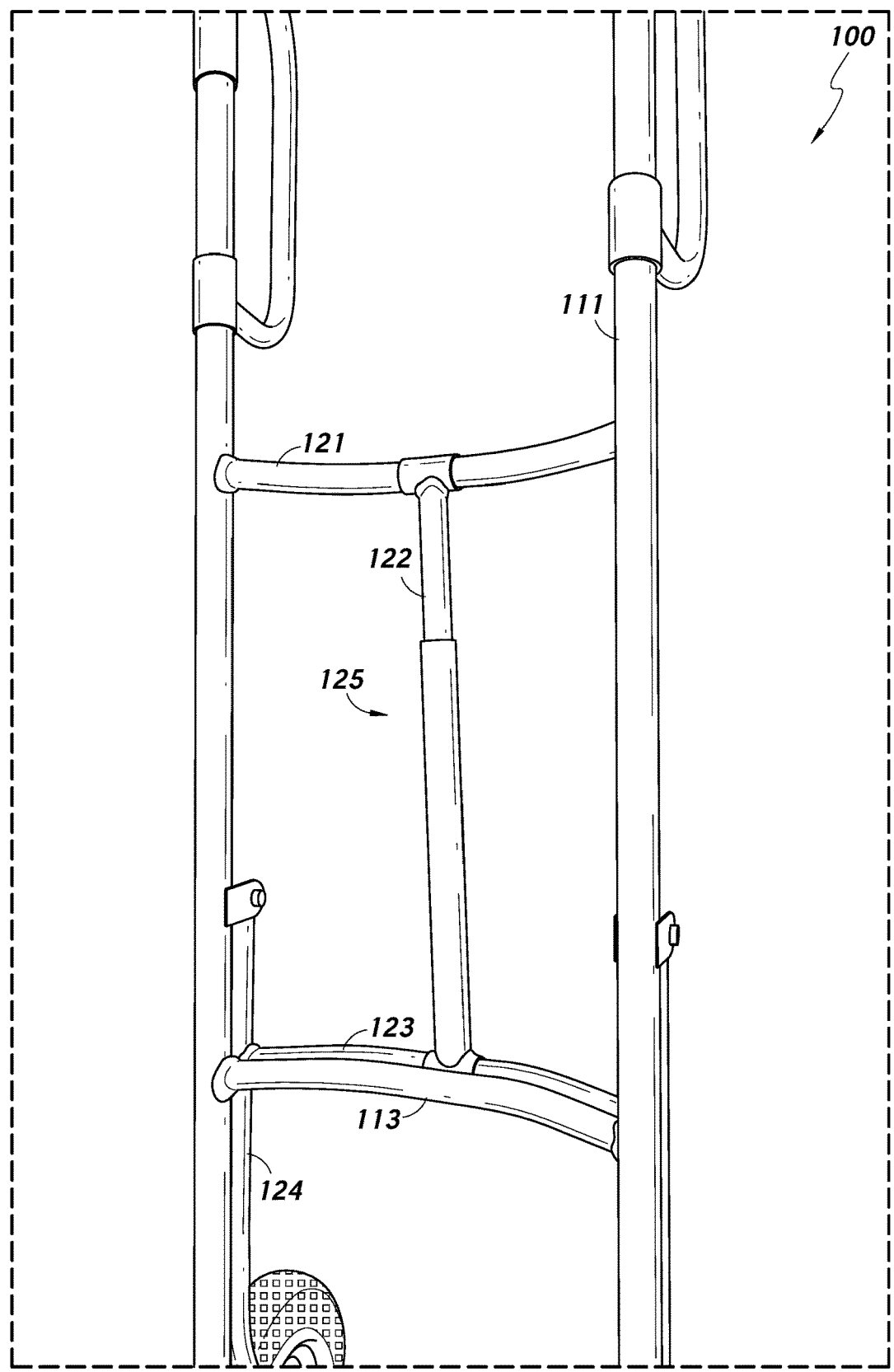

FIGS. 4A, 4B, and 4C illustrate various views of the hand truck 110 to better illustrate the telescoping ram stop 125 in relation to the main platform 110 and the wheel frame 120. The main bar support 121 includes a "T" junction that connects to an upper rod of the telescoping rods 122, the main bar support 121 being fixed to the vertical support bars 111. Similarly, the wheel bar support 123 includes a "T" junction that connects to a lower rod of the telescoping rods 122, the wheel bar support 123 being fixed to the wheel support frame 124. FIGS. 4A and 4B illustrate the hand truck 100 in the open position with the telescoping rods 122 substantially or completely overlapping one another and FIG. 4C illustrates the hand truck 100 in the closed position with the telescoping rods 122 extended, partially overlapping one another. In some embodiments, the wheel bar support 123 is configured to be adjacent to the upper cross bar 113 in the closed position (as illustrated in FIG. 4C).

Figure 5:
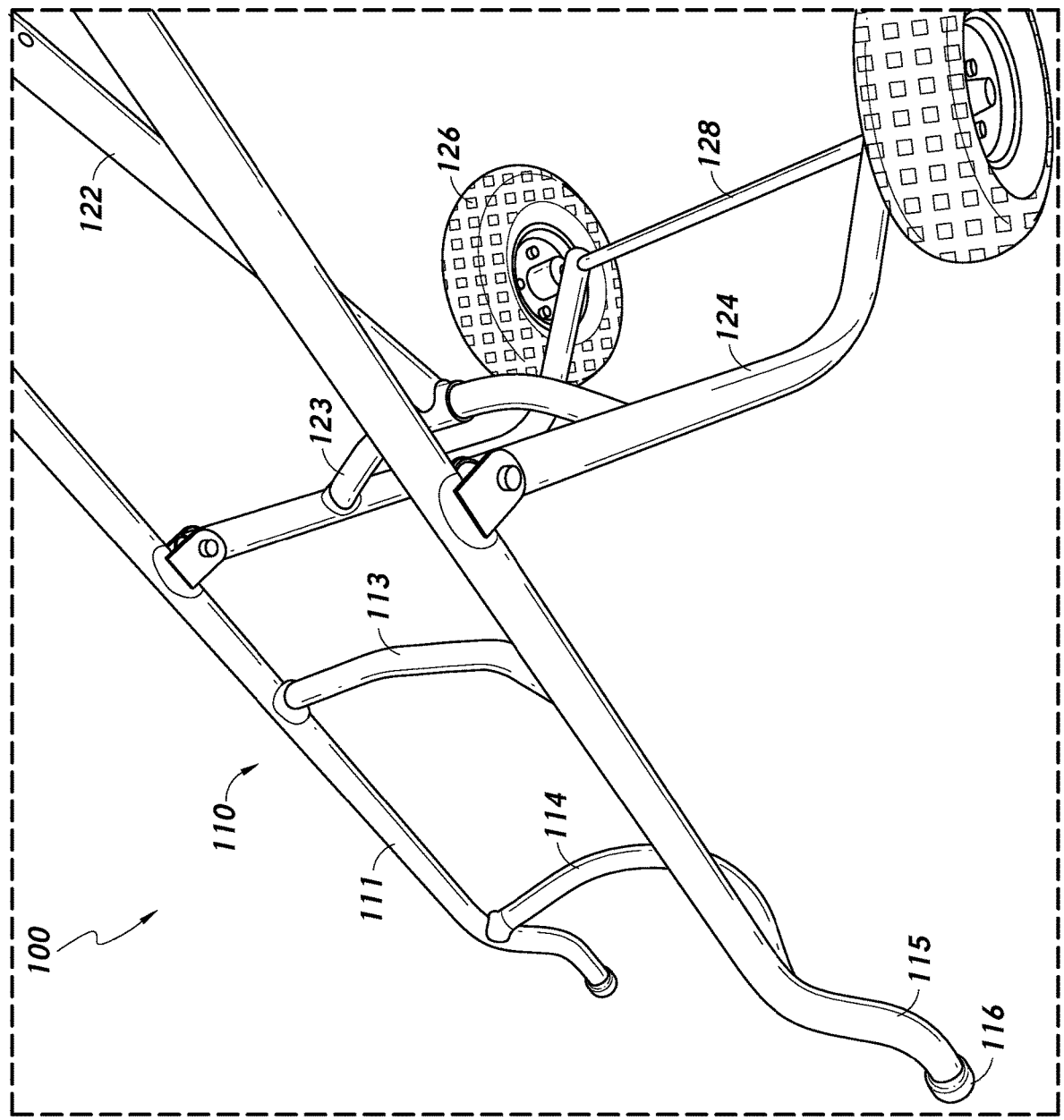
FIG. 5 illustrates the curved legs of the hand truck with rubber stoppers of the main platform.

FIG. 5 illustrates the curved legs 115 with rubber stoppers 116 of the main platform 110. The vertical support bars 111 end at the bottom with the curved legs 115. The curved legs 115 enable a water heater to be lifted onto a platform while keeping the water heater above a water heater pan during installation (and during removal). The vertical support bars 111 are connected by an upper support bar 113 and a lower support bar 114 that support a water heater secured to the main platform 110. The curved legs 115 curve backward toward the wheel frame 120. The amount of curvature is configured so that the rubber stoppers 116 at the distal ends of the curved legs 115 are such that, when rested on an installation platform, the bottom of a water heater is positioned above a water pan. Without this curvature, the bottom of the water would undesirably contact the water pan. The rubber stoppers 116 are an optional feature that reduce slippage to improve the process of installing a water heater. Thus, any suitable material may be used at the distal ends of the curved legs 115 and the disclosure should not be construed to be limited to rubber. For example, the material can be any pliable material with a relatively high coefficient of friction (e.g., relative to the friction between metal and wood or metal and metal).

It should be noted that the hand truck 100 does not include a horizontal ledge or foot at the bottom of the vertical support bars 111 like a typical hand truck for moving boxes or other heavy items. The elimination of the bottom ledge improves the installation procedure for the water heater as it makes it easier to position the water heater in the water pan without contacting the water pan while moving the water heater into place. Furthermore, without the bottom ledge it is easier to remove the hand truck 100 after the water heater has been positioned in the water pan. Without a bottom ledge, straps or other elements can be used to secure the water heater to the main platform 110 rather than relying on the water heater sitting on the bottom ledge.

Figure 6A:
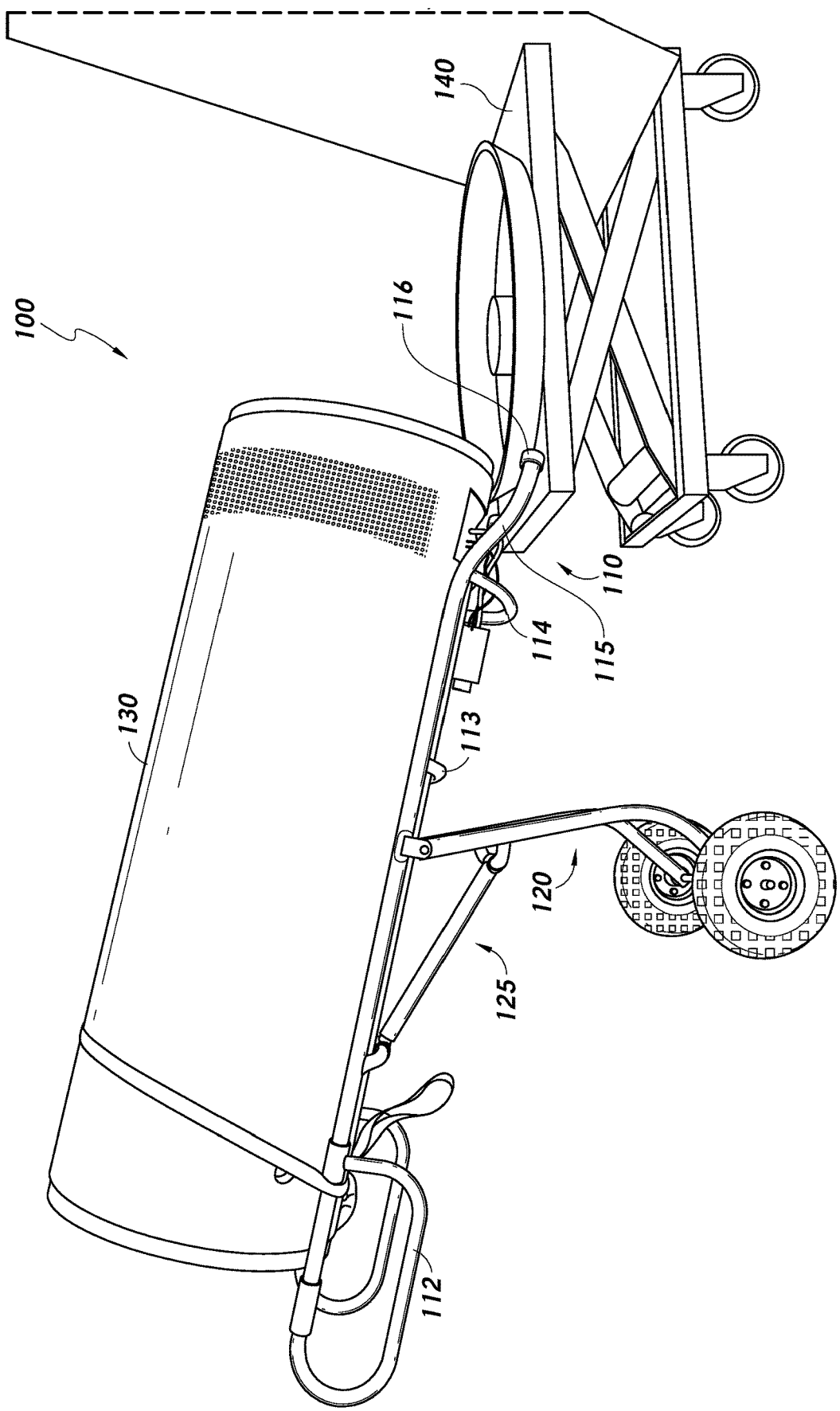
FIGS. 6A, 6B, 6C, 6D, and 6E illustrate the water heater hand truck being used to install a water heater on a platform over a water heater pan.

FIGS. 6A, 6B, 6C, 6D, and 6E illustrate the water heater hand truck 100 being used to install a water heater 130 on a platform 140 over a water heater pan 135. FIG. 6A illustrates the hand truck 100 in the open position with the water heater 130 secured to the main platform 110. The hand truck 110 is tilted backwards (e.g., towards the operator) to allow the curved legs 115 with rubber stoppers 116 to contact the top of the platform 140. As can be seen in this illustration, the curved legs 115 cause the bottom of the water heater 130 to be suspended over the lip of the water heater pan 135.

Figure 6B:
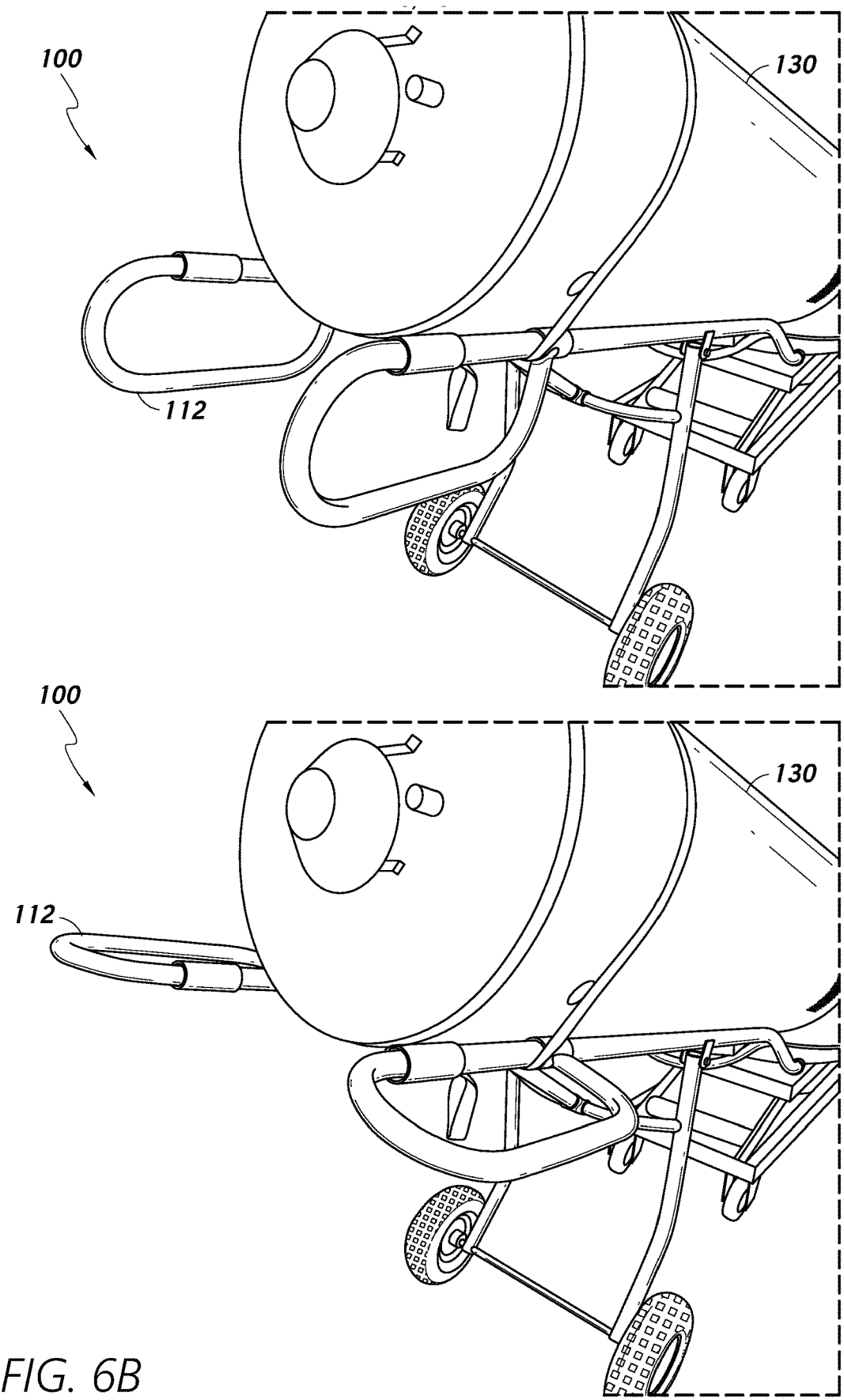

FIG. 6B illustrates the handles 112 being rotated from the backwards orientation (top figure) to the outwards orientation (bottom figure). This can be done to improve leverage for the operator when lifting the water heater 130 into place.

Figure 6C:
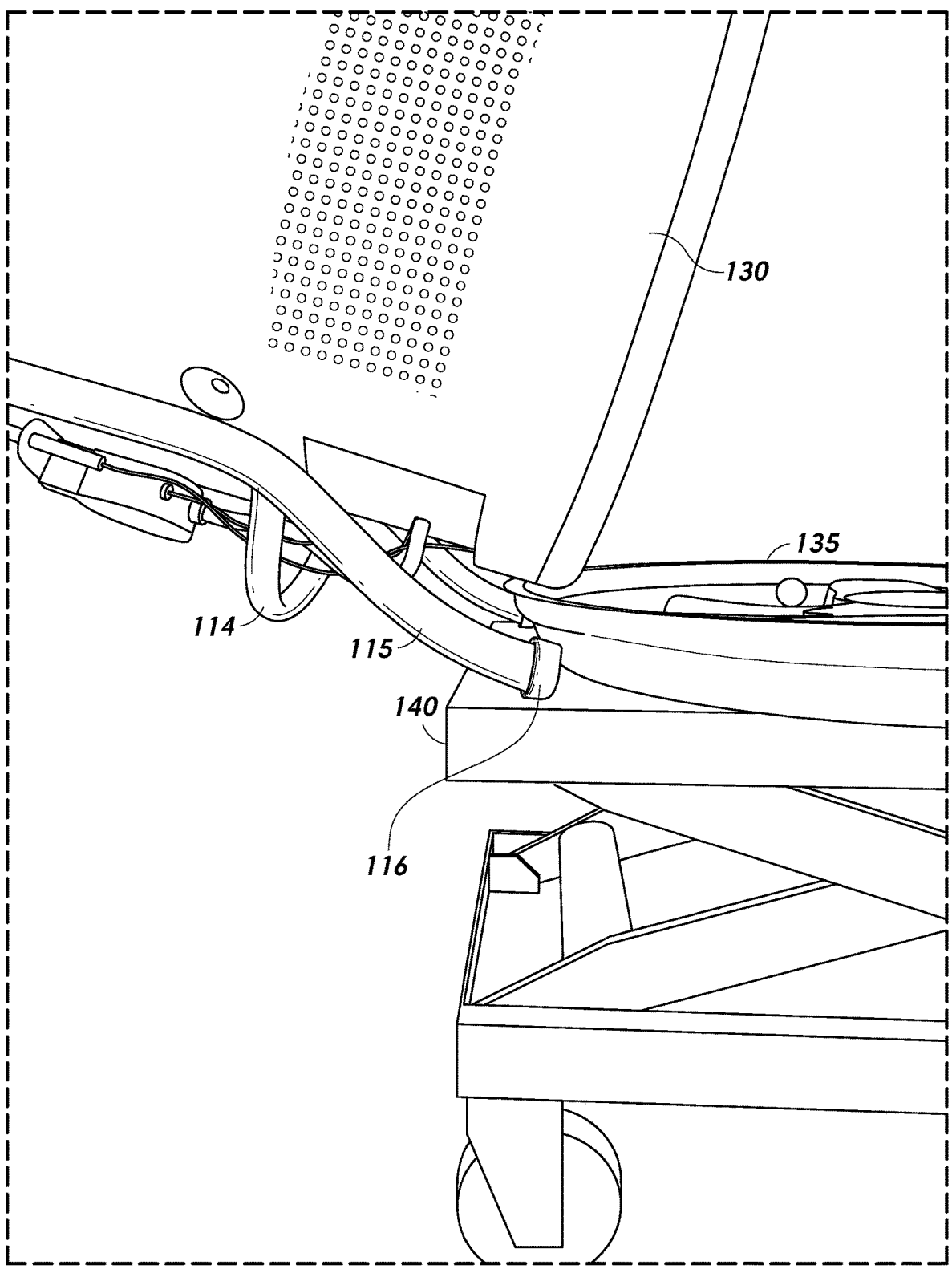

FIG. 6C illustrates a closer view of the curved legs 115 supporting the bottom of the water heater 130 on the platform 140 above the lip of the water heater pan 135 prior to tilting the water heater 130 vertically to install it.

Figure 6D:
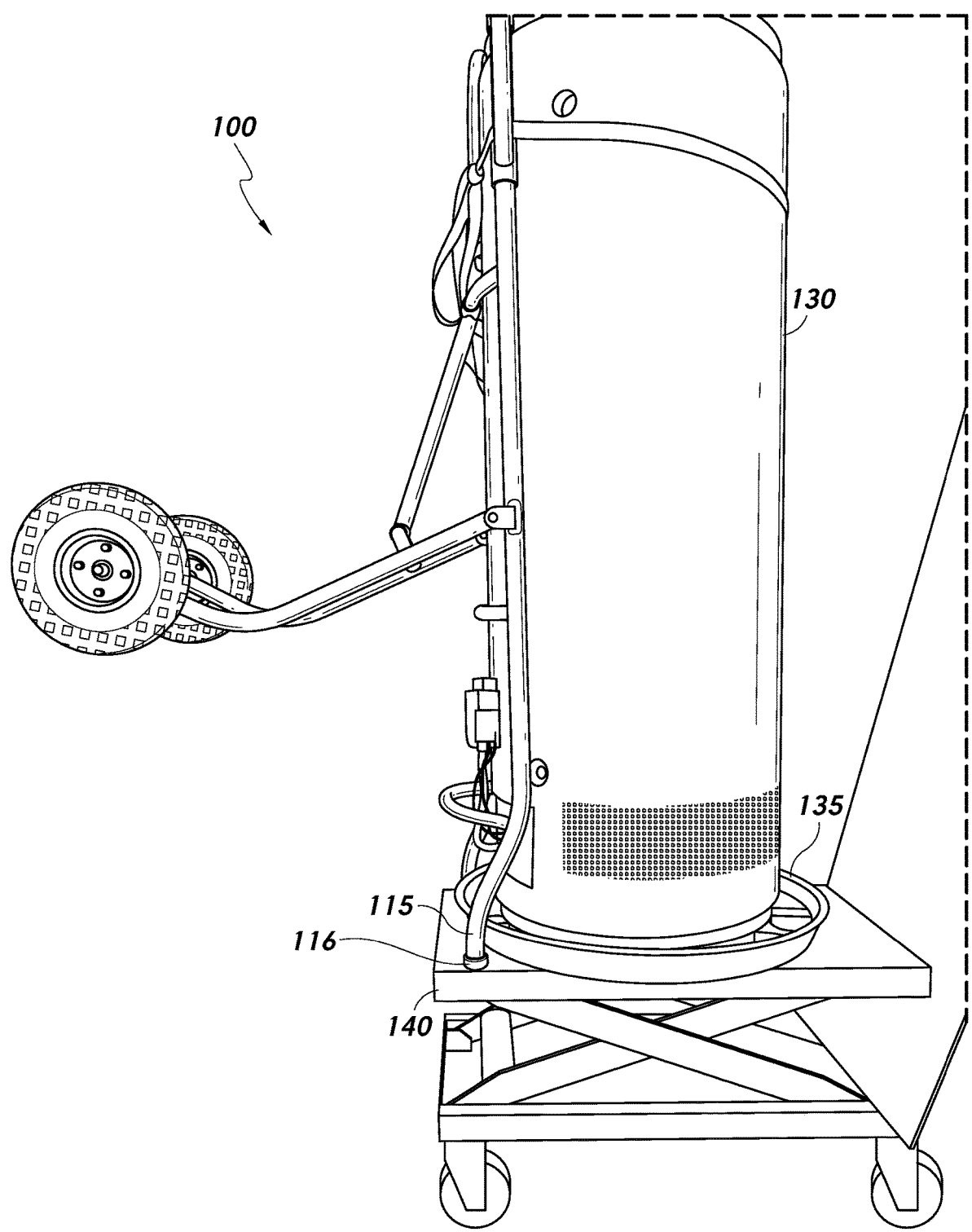

FIG. 6D illustrates the hand truck 100 tilted vertically to install the water heater 130 on the platform 140 in the water heater pan 135. The curved legs 115 enable the water heater 130 to be installed in the water heater pan 135 while the curved legs 115 remained outside of the water heater pan 135 and on the platform 140. The rubber stoppers 116 provide friction during the process of placing the curved legs 115 on the platform 140 and tilting the hand truck 100 from the horizontal orientation to the vertical orientation.

Figure 6E:
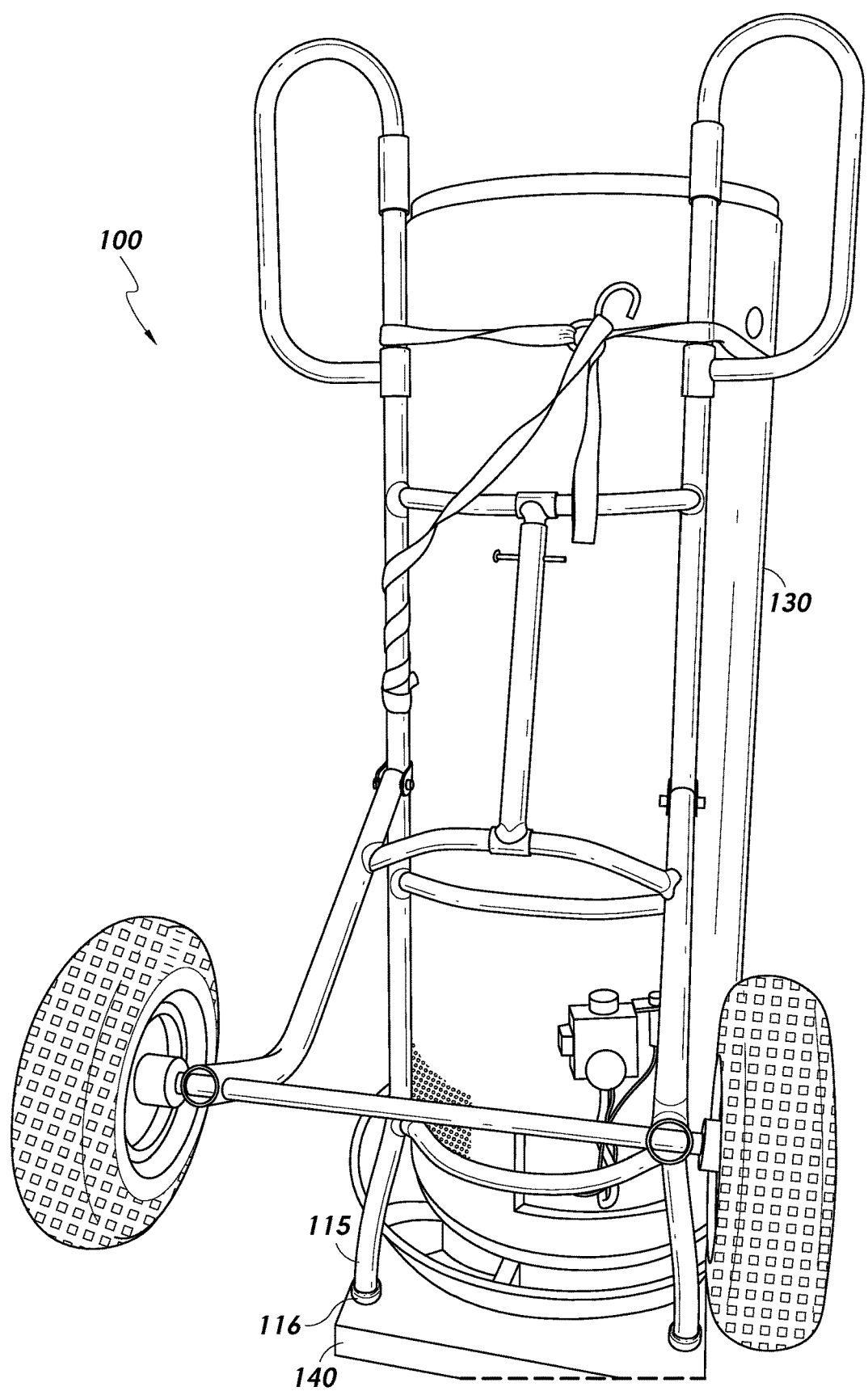

FIG. 6E illustrates a rear view of the hand truck 100 after the water heater 130 has been tilted into place on the platform 140 in the water heater pan 135. In some embodiments, straps can be used to secure the water heater 130 in place.

FIG. 7 illustrates an example handle 712 of a water heater hand truck. The handle 712 is configured to allow the handle 712 to be rotated from a backwards-facing orientation (e.g., see FIGS. 1A-1D) to an outwards-facing orientation (e.g., see FIG. 3). The handle 712 is also configured to limit movement of the handle 712 between these two orientations. For example, the handle 712 can rotate from the backwards-facing orientation to the outwards-facing orientation, as illustrated in FIG. 6B, but can't be rotated past either of these orientations.

The handle 712 includes a c-shaped grip bar 752 that is rotatably coupled to a vertical support bar 711 (similar to the vertical support bar 111 described herein with reference to FIGS. 1A-3) using an upper collar 754 and a lower collar 756. The upper collar 754 couples a top portion of the c-shaped grip bar 752 to a top end of the vertical support bar 711. The upper collar 754 allows for relative rotation between the c-shaped grip bar 752 and the vertical support bar 711. Similarly, the lower collar 756 is affixed to a bottom portion of the c-shaped grip bar 752 and rotatably couples the bottom portion of the c-shaped grip bar 752 to the vertical support bar 711. The lower collar 756 allows for relative rotation between the c-shaped grip bar 752 and the vertical support bar 711. The upper collar 754, the lower collar 756, or both the upper and lower collars 754, 756 can be configured to lock the c-shaped grip bar in the backwards-facing orientation and the outwards-facing orientation. In some embodiments, a pin can be used to lock the handle in the two different orientations.

Figure 8:
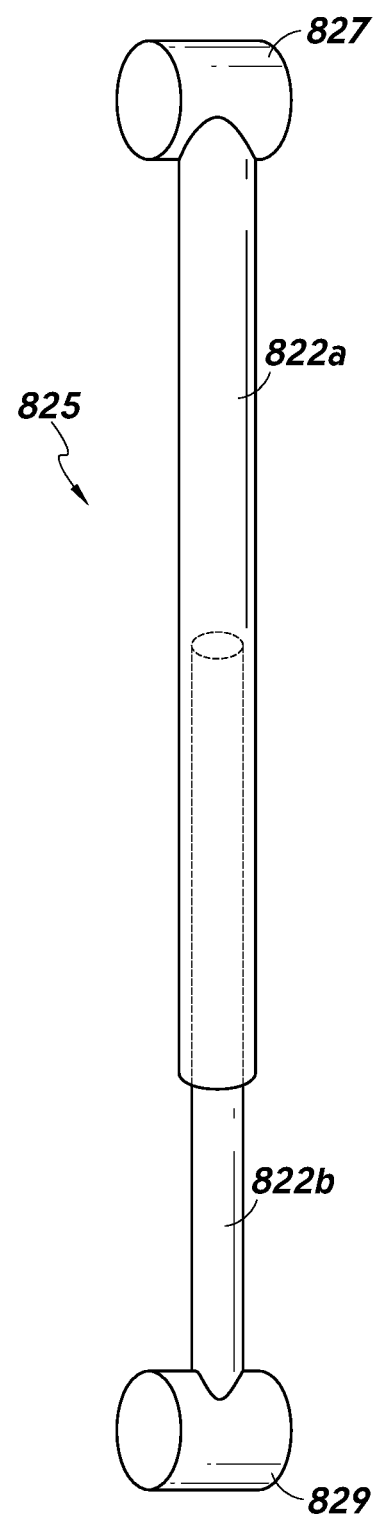
FIG. 8 illustrates a telescoping ram stop of another example water heater hand truck.

FIG. 8 illustrates a telescoping ram stop 825 similar to the telescoping ram stop 125 described elsewhere herein. The telescoping ram stop 825 includes an upper telescoping rod 822a and a lower telescoping rod 822b configured to seat within the upper telescoping rod 822a. This allows the lower telescoping rod 822b to move within the upper telescoping rod 822a. The upper telescoping rod 822a includes a "T" junction 827 that is configured to connect to a main bar support (e.g., the main bar support 121) to secure it to the main platform of the hand truck. Similarly, the lower telescoping rod 822b includes a "T" junction 829 that is configured to connect to a wheel frame support (e.g., the wheel frame support 123) to secure it to the wheel frame of the hand truck. In some embodiments, the upper "T" junction 827 is configured to rotate relative to the main bar support. In certain embodiments, the lower "T" junction 829 is configured to rotate relative to the wheel frame support.

Figure 9A:
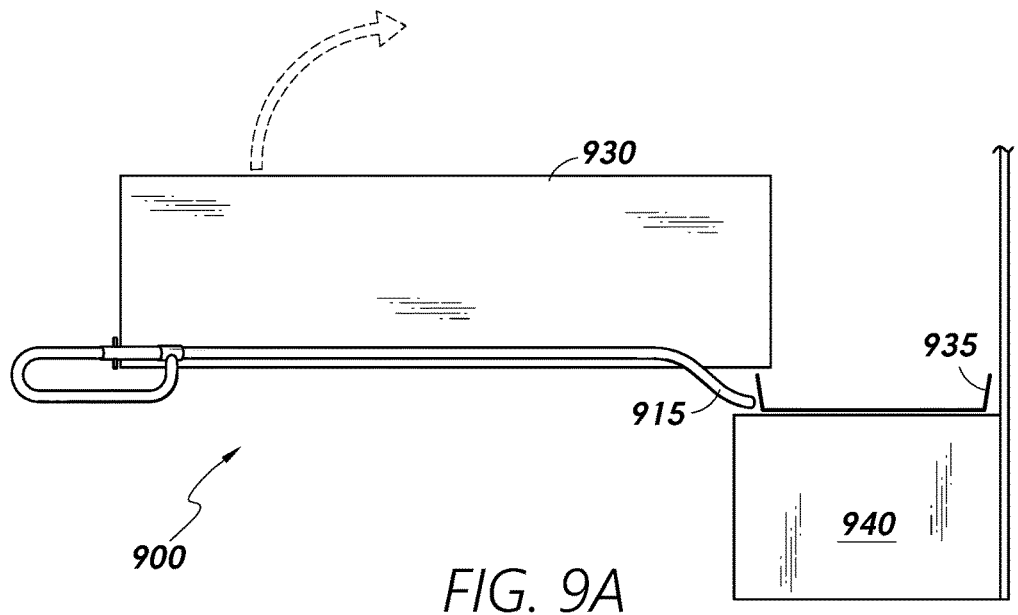
FIGS. 9A and 9B illustrate another example water heater hand truck being used to install a water heater on a platform over a water heater pan.
Figure 9B:
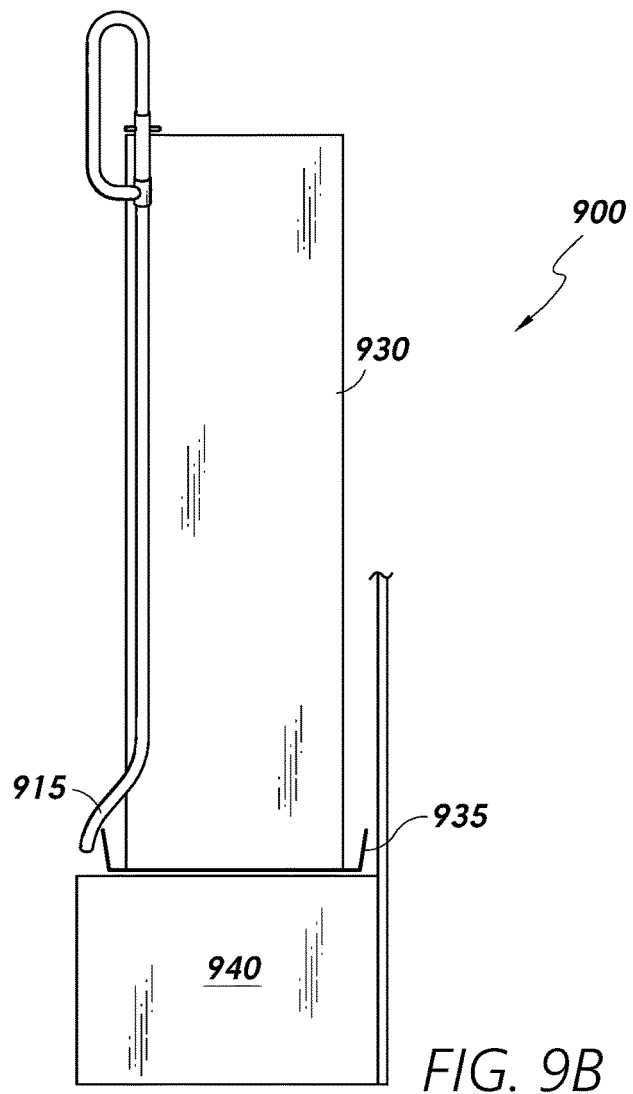
Figure 10A:
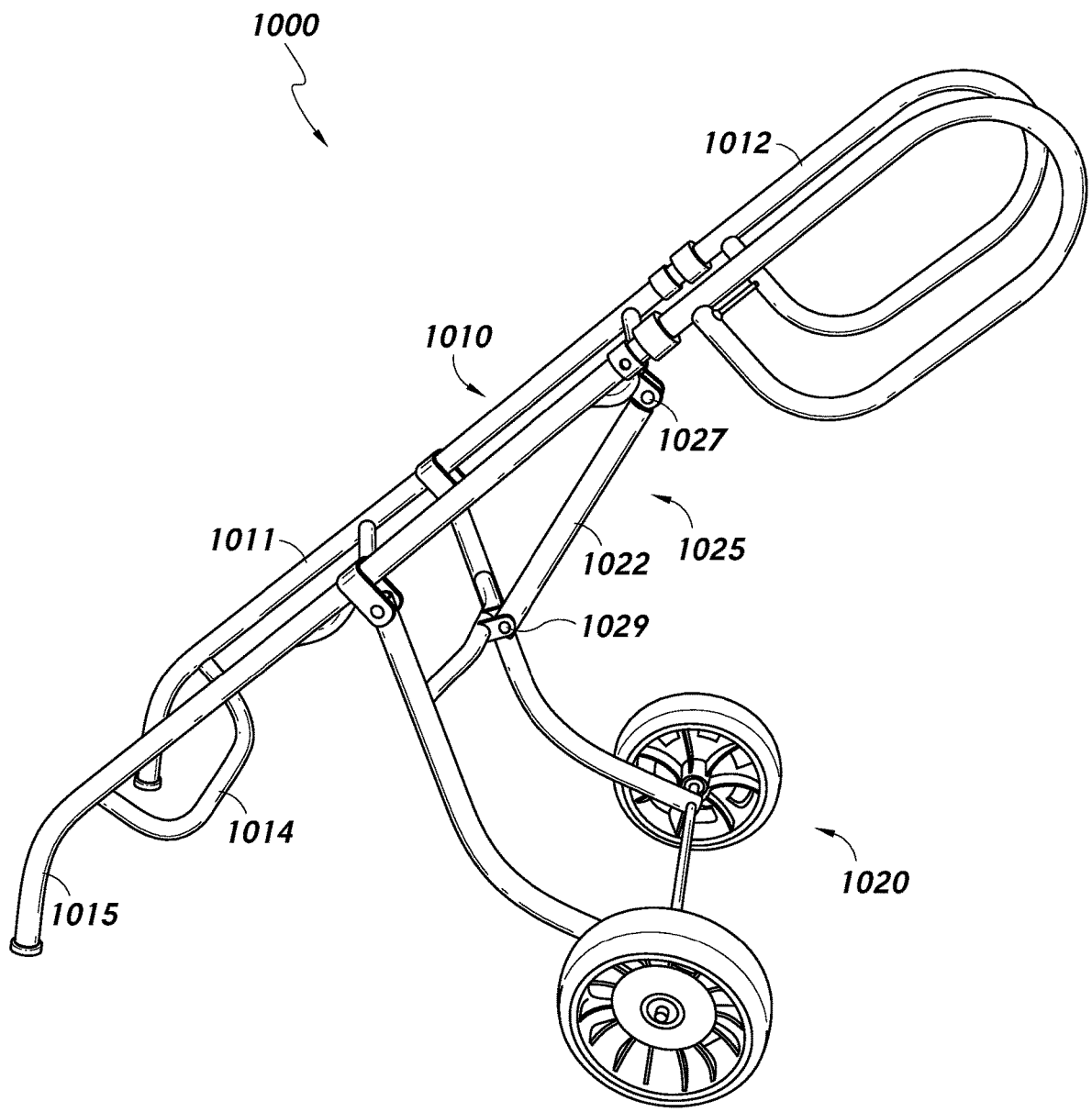
FIGS. 10A, 10B, 10C, and 10D illustrate various views of another example water heater hand truck.
Figure 10B:
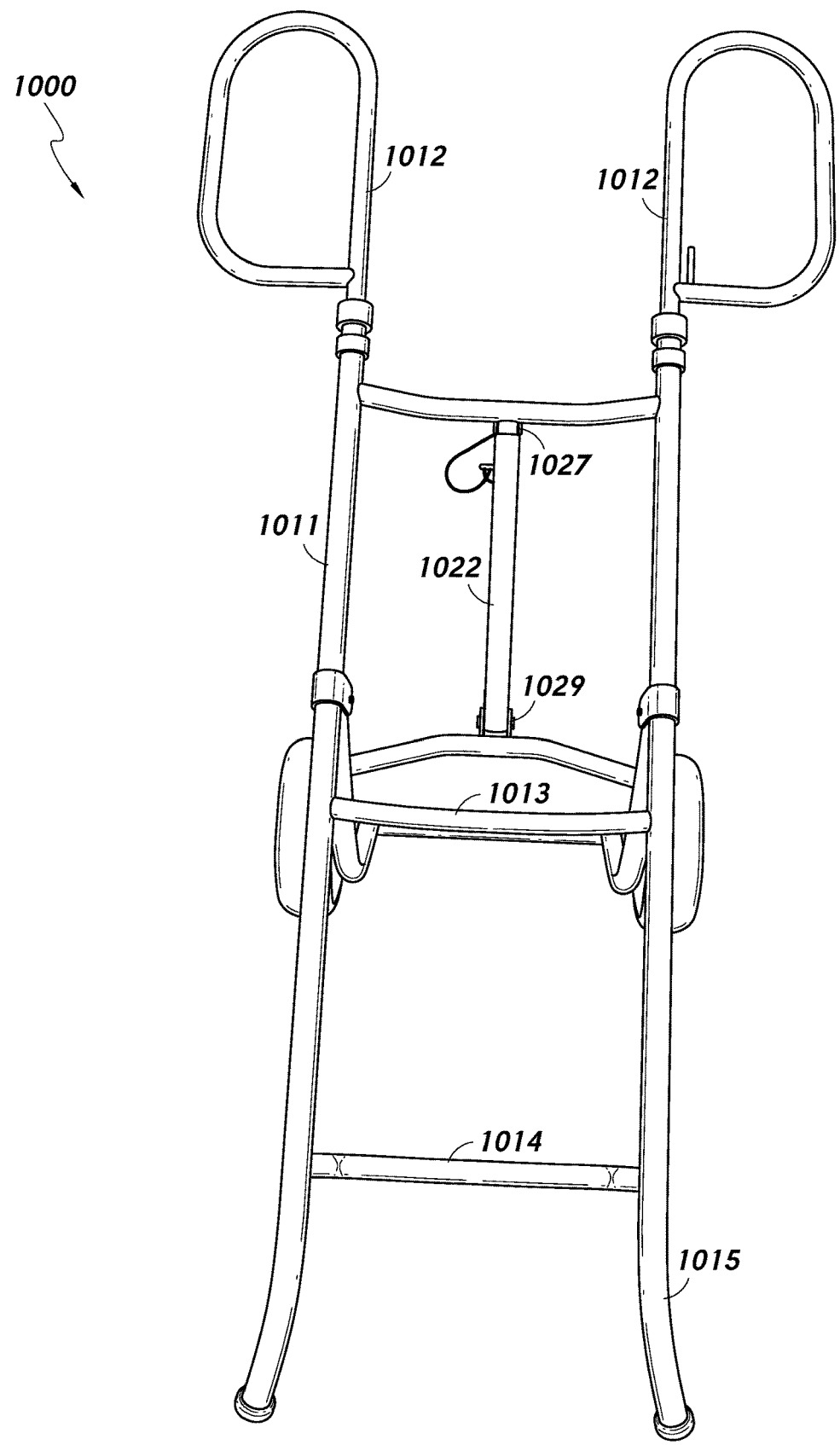
Figure 10C:
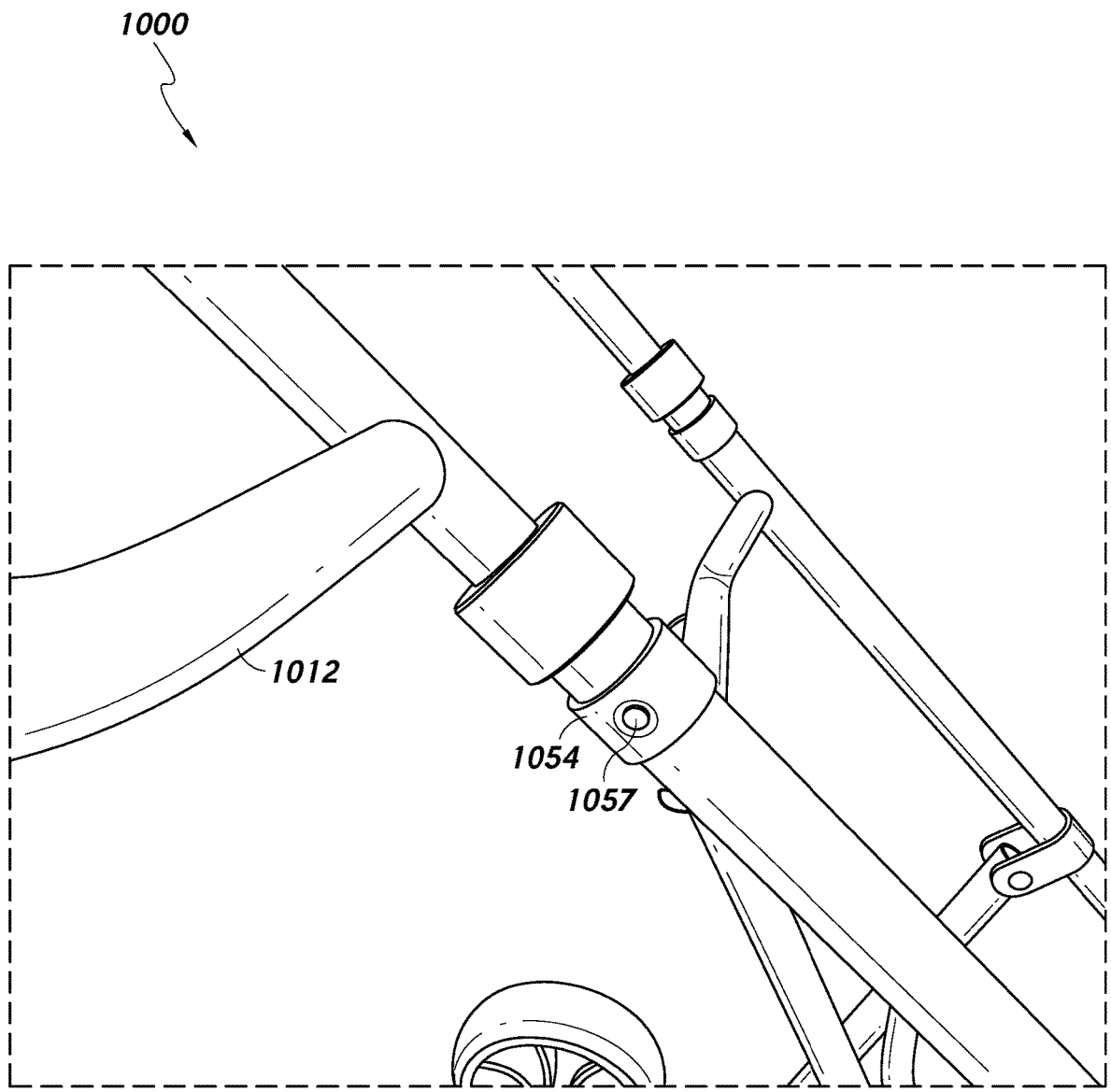
Figure 10D:
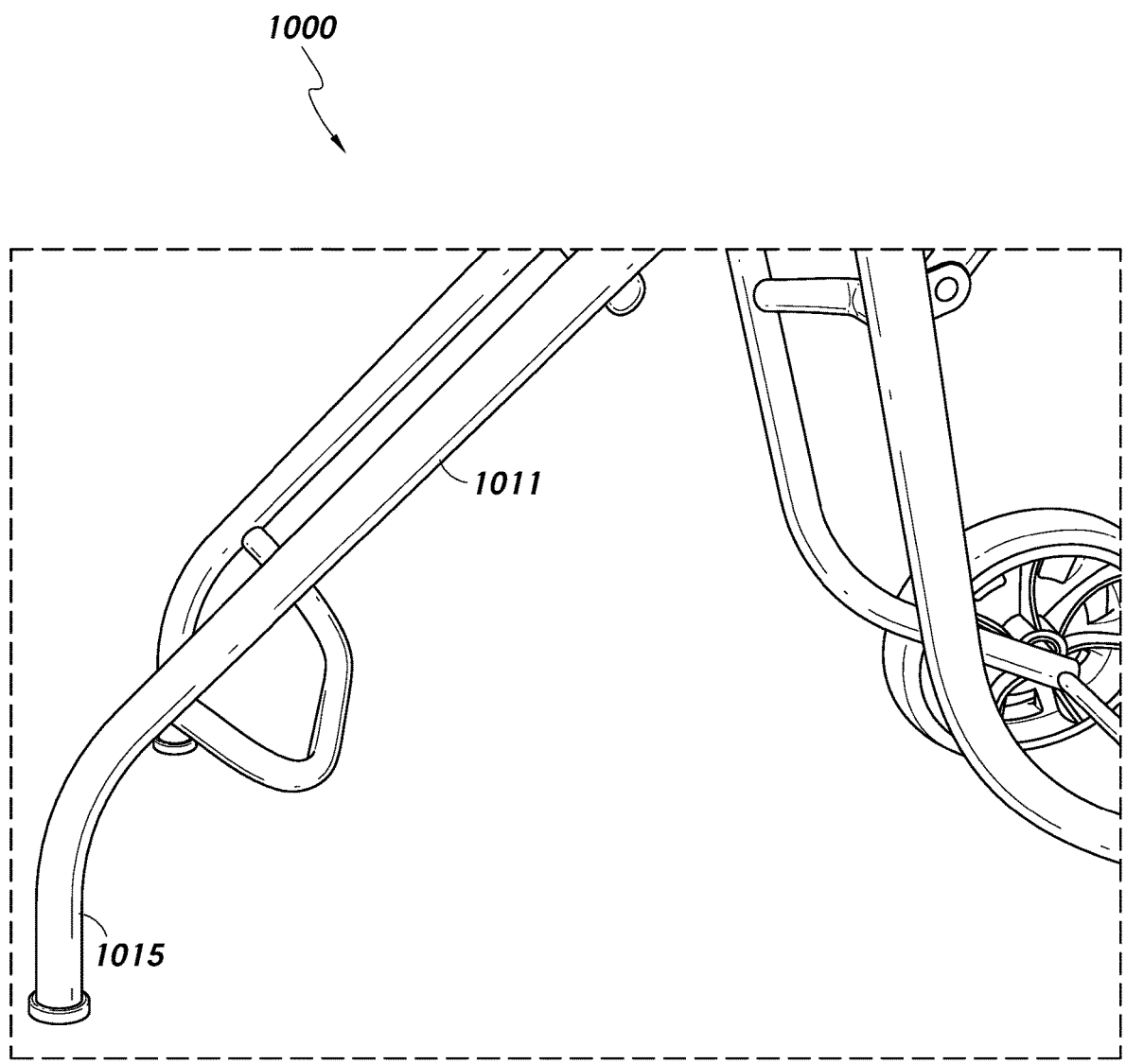

FIGS. 9A-9B illustrate a similar installation procedure as shown in FIGS. 6A-6E, but with a simplified hand truck 900. The hand truck 900 includes curved legs 915 that support the hand truck 900 on a platform 940 over a lip of a water heater pan 935 when installing a water heater 930. FIG. 9A illustrates the hand truck 900 in the horizontal position such that the curved legs 915 support the water heater 930 so that the bottom is over the lip of the water heater pan 935. FIG. 9B illustrates the hand truck 900 rotated or tilted to the vertical position so that the water heater 930 is installed in the water heater pan 935 on the platform 940 while the curved legs 915 still remain outside of the water heater pan 935.

In some embodiments, rather than including vertical support bars, as illustrated herein, other configurations may be used. As an example, a curved or flat piece of metal or other material can be used with curved legs extending from a bottom portion of the piece of material and with handles extending from top portion of the piece of material. In some embodiments, more than 2 vertical support bars may be used in the hand truck (e.g., 3, 4, 5, or more vertical support bars). In some embodiments, a single vertical support bar is used along a majority of the length of the main platform with a pair of curved legs extending from a bottom part of the vertical support bar and with a pair of handles extending from a top part of the vertical support bar. In such embodiments, top and bottom cross bars can be used with the single vertical support bar extending between them. The handles and legs can extend from the top and bottom cross bars, respectively, in such implementations. Other configurations are within the scope of this disclosure as well, including other shapes for the rotating handles other than those illustrated. In addition, the curved legs need not be curved, strictly speaking, and may be angled rather than curved or curved and angled to provide the desired feature of supporting a water heater above a water pan during installation. Furthermore, two or more telescoping ram stops may be used rather than a single telescoping ram stop, as illustrated.

FIGS. 10A, 10B, 10C, and 10D illustrate various views of another example water heater hand truck 1000. The water heater hand truck is similar to the water heater hand truck 100 described herein with variations in at least some of the components or elements of the hand truck 1000 relative to the hand truck 100 of FIGS. 1A-6E. In particular, the hand truck 1000 includes handles 1012 configured similarly to the handles 712 described herein with reference to FIG. 7. As another example, the hand truck 1000 includes curved legs 1015 with a simple curvature compared to more of an "S" curvature implemented in the curved legs 115 of the hand truck 100.

The hand truck 1000 includes a main platform 1010 and a wheel frame 1020. The main platform 1010 of the hand truck 1000 includes a pair of vertical support bars 1011, a pair of rotating handles 1012 coupled to the vertical support bars 1011, an upper cross bar 1013 extending between the vertical support bars 1011, a lower cross bar 1014 extending between the vertical support bars 1011, and curved legs 1015 with rubber stoppers 1016 or rubber landing feet, the curved legs 1015 being a lower extremity of the vertical support bars 1011, curved relative to the vertical support bars 1011. The hand truck 1000 can be transitioned between an open position and a closed position, similar to the hand truck 100.

The wheel frame 1020 of the hand truck 1000 includes a telescoping ram stop 1025, a pair of wheel support bars rotatably coupled to the vertical support bars 1011, wheels at distal ends of the wheel support bars, and an axle extending between the wheels, similar to the hand truck 100.

The telescoping ram stop 1025 is made of telescoping rods 1022 (e.g., nested cylinders) that enable extension of the ram stop 1025 between a shortened configuration (e.g., in the open position of the hand truck 1000) and a lengthened configuration (e.g., in the closed position of the hand truck 1000). The telescoping rod 1022 includes a hinged connector 1027 that is configured to connect to a main bar support to secure it to the main platform 1010 of the hand truck 1000. The telescoping rod 1022 also includes hinged connector 1029 that is configured to connect to a wheel frame support to secure it to the wheel frame 1020 of the hand truck 1000.

The handles 1012 include a pin configuration to enable rotation and locking of the handles in a backward-facing orientation and in an outward-facing orientation. The handles 1012 include a c-shaped grip bar that is rotatably coupled to the vertical support bar 1011 using a collar 1054. The collar 1054 couples the c-shaped grip bar to a top end of the vertical support bar 1011. The collar 754 allows for relative rotation between the c-shaped grip bar and the vertical support bar 1011. The collar 754 can be configured to lock the c-shaped grip bar in the backwards-facing orientation and the outwards-facing orientation using a pin 1057. In some embodiments, a pin can be used to lock the handle in the two different orientations, not necessarily exactly backward-facing and/or outward facing. For example, a first lockable orientation can be one designed to facilitate maneuvering the water heater into place whereas a second orientation can be one designed to improve leverage to facilitate lifting the water heater onto a platform and/or over a water pan.

Figure 11:
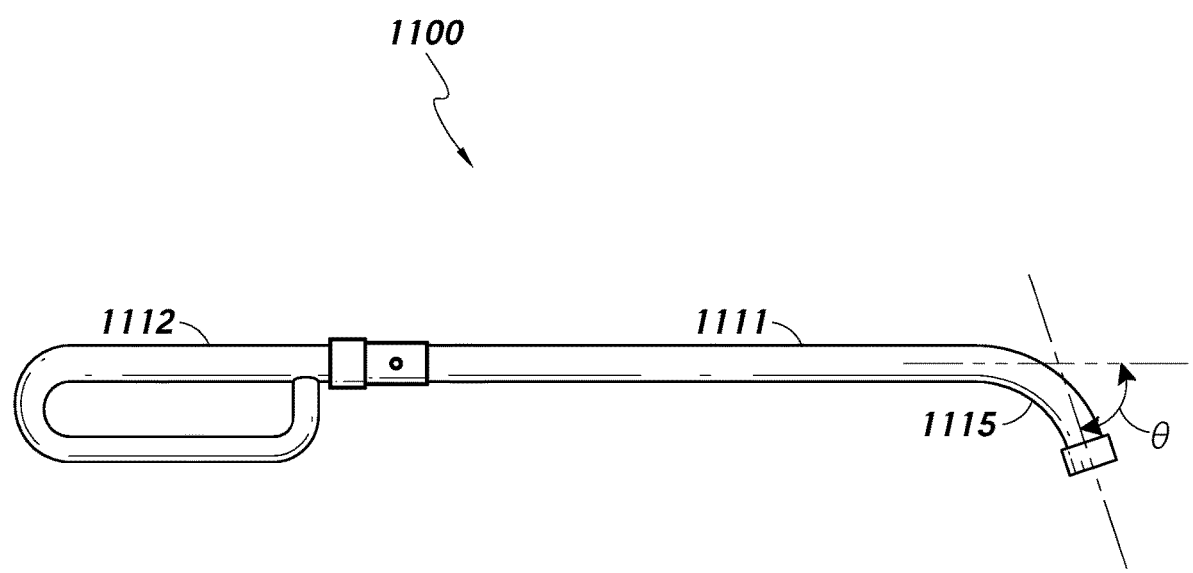
FIG. 11 illustrates an example of curved legs for a water heater hand truck.

FIG. 11 illustrates an example of curved legs 1115 for a water heater hand truck 1100, the curved legs extending from vertical support bars 1111. The handle 1112 is similar to the handle 712 of FIG. 7 and the handles 1012 of FIGS. 10A-10D. The curved legs 1115 can be curved to form an angle, θ, relative to the vertical support bars 1111. In some embodiments, the angle, θ, can be greater than or equal to 15 degrees and/or less than or equal to 75 degrees, greater than or equal to 30 degrees and/or less than or equal to 60 degrees, or greater than or equal to 40 degrees and/or less than or equal to 50 degrees, or about 45 degrees.

The curved legs 1115 can also be curved using other curved configurations, such as an "S" curve similar to the curved legs 115 described herein. In some embodiments, the curved legs 1115 can be bent rather than curved. In some embodiments, the amount of deviation from the vertical support bars 1111 can be suitable to clear a water pan when installing a water heater. In some embodiments, the angle of the rubber feet of the curved legs can be suitable to provide sufficient grip when the hand truck 1100 is approximately horizontal and to maintain the grip as the hand truck is rotated from approximately horizontal to approximately vertical.

Terminology

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A hand truck for installing and removing water heaters, the hand truck comprising:
    a main platform configured to support a water heater, the main platform comprising:
        a pair of vertical support bars, with each vertical support bar ending in a curved leg at a distal end of the vertical support bar;
        one or more cross bars extending between the pair of vertical support bars, the one or more cross bars being curved to conform to a shape of the water heater supported by the main platform; and
        a pair of handles at respective proximal ends of the pair of vertical support bars; and
    a wheel frame coupled to the main platform, the wheel frame comprising:
        a pair of wheel support bars coupled to the main platform, each wheel support bar configured to support a wheel at a distal end of the wheel support bar; and
        a telescopic ram stop coupled to the pair of wheel support bars and to the main platform, the telescopic ram stop configured to guide the wheel frame from a closed position to an open position,
    wherein each curved leg of the pair of vertical support bars is configured such that a distal end of each curved leg curves backwards towards the wheel platform to form an angle with the respective vertical support bar, the angle being greater than or equal to 15 degrees, and
    wherein the main platform does not include a horizontal ledge or foot configured to support a water heater.

2. The hand truck of claim 1, wherein the angle is less than or equal to 75 degrees.

3. The hand truck of claim 1, wherein the telescopic ram stop is coupled to the pair of wheel support bars by being coupled to a main support bar that connects to the pair of vertical support bars.

4. The hand truck of claim 1, wherein the wheel frame is coupled to the main platform using a pair of hinges to allow the pair of wheel support bars to rotate relative to the pair of vertical support bars.

5. The hand truck of claim 1, wherein the wheel frame is configured to support the main platform horizontally in the open position.

6. The hand truck of claim 5, wherein the pair of wheel support bars are perpendicular to the pair of vertical support bars in the open position.

7. The hand truck of claim 1, wherein the wheel frame is configured to support the main platform vertically in the closed position.

8. The hand truck of claim 7, wherein the pair of wheel support bars are parallel to the pair of vertical support bars in the closed position.

9. The hand truck of claim 1, wherein each handle of the pair of handles is configured to rotate around an axis defined by the vertical support bar to which the handle is coupled.

10. The hand truck of claim 9, wherein each handle is configured to rotate 90 degrees around the axis defined by the vertical support bar.

11. The hand truck of claim 1 further comprising a first hinged connector that is configured to connect to a main bar support of the one or more support bars to secure the telescopic ram stop to the main platform.

12. The hand truck of claim 11, wherein the wheel frame further includes a wheel bar support between the pair of wheel support bars.

13. The hand truck of claim 12 further comprising a second hinged connector that is configured to connect the telescopic ram stop to the wheel bar support.

* * * * *